(12) United States Patent
Ishii et al.

(10) Patent No.: US 8,352,594 B2
(45) Date of Patent: Jan. 8, 2013

(54) NETWORK MONITORING DEVICE, BUS SYSTEM MONITORING DEVICE, METHOD AND PROGRAM

(75) Inventors: Tomoki Ishii, Kyoto (JP); Takao Yamaguchi, Osaka (JP); Atsushi Yoshida, Osaka (JP)

(73) Assignee: Panasonic Corporation, Osaka (JP)

( * ) Notice: Subject to any disclaimer, the term of this patent is extended or adjusted under 35 U.S.C. 154(b) by 314 days.

(21) Appl. No.: 12/989,808

(22) PCT Filed: Jun. 12, 2009

(86) PCT No.: PCT/JP2009/002660
§ 371 (c)(1),
(2), (4) Date: Oct. 27, 2010

(87) PCT Pub. No.: WO2009/150849
PCT Pub. Date: Dec. 17, 2009

(65) Prior Publication Data
US 2011/0060831 A1 Mar. 10, 2011

(30) Foreign Application Priority Data

Jun. 12, 2008 (JP) .................................. 2008-154031
Jan. 30, 2009 (JP) .................................. 2009-021006

(51) Int. Cl.
*G06F 15/173* (2006.01)

(52) U.S. Cl. ......... 709/224; 370/315; 370/327; 370/328

(58) Field of Classification Search .................. 370/315, 370/328, 329, 231, 235, 531, 524, 252; 709/224
See application file for complete search history.

(56) References Cited

U.S. PATENT DOCUMENTS 5,161,107 A * 11/1992 Mayeaux et al. ............. 701/117
(Continued)

FOREIGN PATENT DOCUMENTS

JP 2002-152204 5/2002
(Continued)

OTHER PUBLICATIONS

International Search Report issued Nov. 2, 2009 in International (PCT) Application No. PCT/JP2009/002660.

(Continued)

*Primary Examiner* — Ian N Moore
*Assistant Examiner* — Phong LA
(74) *Attorney, Agent, or Firm* — Wenderoth, Lind & Ponack, LLP.

(57) ABSTRACT

A network monitoring device which monitors a network in which data is transmitted through relays, includes a monitoring frequency recording unit (111) which records monitoring frequencies for monitoring transmission statuses of the relays, a selection probability generating unit (112) which generates selection probability information which is probability values for the relays, a monitoring object determining unit (113) which determines, according to the monitoring frequency and the selection probability information, a relay the transmission status of which is to be monitored, a transmission status obtaining unit (106) which obtains transmission status information indicating a transmission status on the relay determined, a transmission status recording unit (107) which records the transmission status information, an activation level calculating unit (109) which calculates, using the transmission status information, activation level indicating suitability of the monitoring on the transmission statuses of the relays, and a monitoring frequency updating unit (110) which updates, based on the activation level, the monitoring frequency, and the network monitoring device detects the change in throughput on a data transmission path highly responsively.

11 Claims, 36 Drawing Sheets

U.S. PATENT DOCUMENTS

| | | | |
|---|---|---|---|
| 7,292,540 B2 * | 11/2007 | Yada et al. | 370/253 |
| 7,353,269 B2 * | 4/2008 | Aki et al. | 709/224 |
| 7,733,791 B2 * | 6/2010 | Kusama et al. | 370/252 |
| 7,821,550 B2 * | 10/2010 | Yamashina | 348/231.7 |
| 8,115,812 B2 | 2/2012 | Yoshida et al. | 348/159 |
| 8,253,592 B1 * | 8/2012 | Chandra et al. | 340/917 |
| 8,274,911 B2 * | 9/2012 | Arai et al. | 370/252 |
| 2002/0083169 A1 | 6/2002 | Aki et al. | |
| 2002/0194361 A1 * | 12/2002 | Itoh et al. | 709/233 |
| 2003/0152034 A1 | 8/2003 | Zhang et al. | |
| 2006/0209701 A1 | 9/2006 | Zhang et al. | |
| 2006/0221825 A1 * | 10/2006 | Okano | 370/229 |
| 2006/0240783 A1 * | 10/2006 | Kawada | 455/69 |
| 2007/0211623 A1 * | 9/2007 | Nishioka | 370/218 |
| 2009/0024895 A1 * | 1/2009 | Lin | 714/749 |
| 2009/0324222 A1 * | 12/2009 | Kunjidhapatham et al. | 398/58 |
| 2011/0307604 A1 * | 12/2011 | Wakuda | 709/224 |

FOREIGN PATENT DOCUMENTS

| | | | |
|---|---|---|---|
| JP | 2002-252614 | | 9/2002 |
| JP | 2003-249960 | | 9/2003 |
| JP | 2004-134966 | | 4/2004 |
| JP | 2004134966 | * | 4/2004 |
| JP | 3662907 | | 6/2005 |
| JP | 2005-318222 | | 11/2005 |
| JP | 2005318222 | * | 11/2005 |

OTHER PUBLICATIONS

M. Handley et al., TCP Friendly Rate Control (TFRC) : Protocol Specification, Jan. 2003, The Internet Society (2003).

K. Leibnitz, et al, "Resilient Multi-path Routing Based on a Biological Attractor Selection Scheme," The Second International Workshop on Biologically Inspired Approaches to Advanced Information Technology (BioAdit 2006), Osaka, Japan, Jan. 2006.

* cited by examiner

FIG. 8

| Relay hop count | Relay IP address | Path RTT | Link RTT |
|---|---|---|---|
| 1 | fd00::21 | 6ms | 6ms |
| 2 | fd00::22 | 12ms | 6ms |
| 3 | fd00::23 | 42ms | 30ms |
| 4 | fd00::24 | 51ms | 9ms |

FIG. 14

| Relay hop count | Relay IP address | Monitoring frequency |
|---|---|---|
| 1 | fd00::21 | 0.87 |
| 2 | fd00::22 | 0.21 |
| 3 | fd00::23 | 0.65 |
| 4 | fd00::24 | 0.90 |

FIG. 16

| Relay hop count | Relay IP address | Normalized monitoring frequency |
|---|---|---|
| 1 | fd00::21 | 0.34 |
| 2 | fd00::22 | 0.09 |
| 3 | fd00::23 | 0.24 |
| 4 | fd00::24 | 0.33 |

FIG. 23

| DSP sub address | Maximum transfer speed | Generated data amount | Difference of generated data amount | Difference of normalized generated data amount |
|---|---|---|---|---|
| 0x02 | 90,000,000 | 82,861,056 | 0 | 0.00 |
| 0x03 | 91,700,000 | 83,269,138 | 400,000 | 0.25 |
| 0x04 | 361,700,000 | 83,269,138 | 400,000 | 0.25 |
| 0x04 | 6,000,000 | 4,800,000 | 1,200,000 | 0.75 |

FIG. 29

| Notification request packet | Address of NoC router from which notification is requested | Address of core processor which is transmission source | Request flag | 0 | 0 |

FIG. 30

| Notification packet | Address of core processor which is transmission source | Address of NoC router that issued notification | Notification flag | Port | Average stay time |

FIG. 34

| Relaying hop count | PLC modem | Monitoring frequency | 0~1 | 19~20 | 20~21 | 21~22 | 23~24 |
|---|---|---|---|---|---|---|---|
| 1 | 501 | 0.87 | 300 | 100 | 50 | 100 | 300 |
| 2 | 505 | 0.21 | 300 | 500 | 1000 | 500 | 300 |
| 3 | 506 | 0.65 | 300 | 100 | 50 | 500 | 300 |
| 4 | 507 | 0.90 | 300 | 300 | 100 | 100 | 300 |

History of number of monitoring

NETWORK MONITORING DEVICE, BUS SYSTEM MONITORING DEVICE, METHOD AND PROGRAM

TECHNICAL FIELD

The present invention relates to a communication device which is embedded with a communication status monitoring technology in a data transmission path in a packet exchange network such as the IP network and the wireless ad hoc network, a communication method, and a program.

BACKGROUND ART

Throughput is conventionally used as one of the indexes indicating the status of the communication path when transferring data from a transmitter to a receiver, in a band-sharing packet exchanging network such as the Internet, intranet, and wireless IP network. The throughput is an effective transfer rate of the communication path per unit time measured between a transmission end and a reception end represented in the number of bits transferred per second. The unit bps is usually used.

For example, as a specific video in the video transferring system for transferring the videos captured by street cameras, the traffic currently focused by the user is referred to as observed traffic. Meanwhile, the rest of the traffic that could affect the observed traffic is referred to as cross traffic.

The cross traffic includes, not only the traffic generated by another application, but also the traffic generated by other camera which is on the same video transferring system and currently not focused.

The throughput between relays on a communication path from the transmitter to the receiver is not temporally constant, but usually changing. The main factor of the change in the throughput of the links between the relays is the change in the resource of the links available for transferring the observed traffic, due to temporal change in the cross traffic.

The temporal change in throughput does not cause problems so often in the elastic applications such as web access or file transfer. On the other hand, real-time applications such as video transfer and audio telephone are very sensitive to the change in transmission quality such as latency or jitter on the communication path. Thus, the change in throughput significantly affects the quality of the entire service directly.

In order to prevent the reduction in the service quality caused by the change in throughput, the transmitter sequentially detects the change in throughput on the transmission path, and controls the transmission rate according to the status of the path.

Roughly speaking, the first conventional technology which monitors the receiver and the second conventional technology which monitors the relay on the path are methods for detecting the change in throughput on the communication path in order to control the transmission rate at the transmitter.

An example of the first conventional technology is the TCP Friendly Rate Control (TFRC) standardized by the Internet Engineering Task Force (IETF).

FIG. 35 illustrates the streaming distribution of the video data from the transmitter A to the receiver B. The transmitter A divides the video data to be transmitted, and stores the data in the User Datagram Protocol (UDP) packets, and sends the packets to the receiver B.

The receiver B calculates the reception loss rate (LOSS) which indicates a degree of packet loss per unit time by statistically measuring the received packets. Furthermore, Round-Trip Time (RTT) on the communication path on the transmitter A and the receiver B are also calculated, based on the time stamp indicating the transmission time and the time stamp indicating the reception time.

The receiver B stores the RTT and the reception loss rate in the measuring packet, according to the predetermined time cycle and sends feedback to the transmitter A. With this, the receiver B transmits the transmission status of the communication path to the transmitter A by feeding back to the transmitter A. The transmitter A which received the measuring packet controls the transmission rate from the reception loss rate and the RU according to Equation 1.

[Equation 1]

$$R = \frac{MTU}{RTT \cdot \sqrt{2 \cdot LOSS/3} + T_0 \cdot (3\sqrt{3 \cdot LOSS/8}) \cdot LOSS \cdot (1 + 32 \cdot LOSS^2)} \quad \text{(Equation 1)}$$

In the equation, R denotes a transmission rate, Maximum Transmission Unit (MTU) denotes a length of transmission unit on a path, and $T_0$ is a timeout period of a Transmission Control Protocol (TCP) session.

Furthermore, as an example of the second conventional technology, Patent Literature 1 discloses a method for selecting the relay to be monitored by steadily monitoring the relay with the smallest capacity bandwidth. Conventional bandwidth estimation technology such as one-packet estimation is used for estimating the capacity bandwidth of each relay.

In addition, as another example of the second conventional technology, Patent Literature 2 discloses a method for selecting a relay inclined to congestion based on the history information of the transmission status of the relay, and monitors the selected relay.

FIG. 36 illustrates a state where a data transmission application is activated on a P2P network in Patent Literature 2. The data transmission application includes a transmission program that operates on a peer 1, a transmission data relaying program that operates on the peer 2, peer 3, and peer 4, and a reception program that operates on the peer 5, and the programs correspond to a transmitter, a relay, and a receiver, respectively. The quality information table on which the quality information of each relay is recorded is managed on the transmitter A. On the quality information table, the relay numbers are sorted by the transmission quality indicated by the quality information and displayed. The estimated load for each relay estimated by the pair-packet estimating method is used as an example.

The transmitter A periodically reexamines quality information for the relays of a fixed number recorded on the higher order of the quality information table, updates the quality information table using the result, and sorts the quality information table again. Suppose the fixed number is three, and the relay 3, the relay 6, the relay 1, the relay 4 . . . , are recorded on the quality table in the order of higher order, the transmitter A measures the level of load on three relays: the relay 3; the relay 6; and the relay 1; using the pair packet estimation method at the next periodic timing. The measurement result is written on a corresponding position of the quality information table, and the quality information table is sorted again.

Here, when the re-measured load of the relay 1 is smaller than the load of the relay 4 that is not re-measured, the order change occurs at the time of sorting, and the relays are arranged in the order of the relay 3, the relay 6, the relay 4, and the relay 1, from the higher order of the quality information table. Changing the relay on the higher order on the quality information table with time follows the dynamic change on the load of the relays.

CITATION LIST

[Patent Literature]
[Patent Literature 1] Japanese Patent No. 3662907
[Patent Literature 2] Japanese Unexamined Patent Application Publication No. 2003-249960
[Non Patent Literature]
[Non-Patent Literature 1] IETF RFC3448 TFRC: TCP Friendly Rate Control
[Non-Patent Literature 2] K. Leibnitz, N. Wakamiya and M. Murata "Resilient Multi-path Routing Based on a Biological Attractor Selection Scheme" The Second International Workshop on Biologically Inspired Approaches to Advanced Information Technology (BioAdit 2006), Osaka, Japan, January 2006.

SUMMARY OF INVENTION

Technical Problem

The problem of the first conventional technology upon monitoring the change in throughput is that the monitoring is not very up-to-date. The transmission time stamp and the reception time stamp of the probing packet are necessary for calculating the RTT necessary for the transmitter to send a feedback to the receiver.

As illustrated in FIG. 35, when the throughput between the relay 3 and the relay 4 decreases due to a sudden flow of the cross traffic to the relay 4, a back log is generated in the output buffer in the relay 3. The probing packet reaches the relay 4 after the back log is resolved, and probing packet is subsequently received by the receiver. In the receiver, increase in the RTT is detected after the probing packet is received. Feeding back the result to the transmitter adjusts the transmission rate.

In such a case, the timing for detecting the change in the throughput by the transmitter and the actual timing of the cross traffic significantly vary. Thus, it was difficult to perform highly up-to-date detection of the change in the throughput.

The second conventional technology is highly responsive compared to the first conventional technology that monitors the receiver, since the relay on the path is monitored. The feature of this method is in a method how a relay is made to be a relay to be monitored among all of the relays on the path.

According to the method in Patent Literature 1, the relay with the smallest physical communication bandwidth is identified, and the relay is steadily monitored. The problem in this steady monitoring is that the change in the throughput occurred in the relay that was not selected as the relay to be monitored cannot be detected. In consideration of the application for the uses in which the generation path or the generation time of the cross traffic are not estimated, there is a possibility of lowered monitoring accuracy.

According to the method in Patent Literature 2, the relay to be monitored is selected according to the change in the throughput, instead of the steady monitoring. However, considering the case where the number of relays to be re-measured is set to be small, the conditions for re-measuring the relay would be limited as the lower the order of the relay in the quality information table becomes. Thus, it takes longer until the re-measuring.

For example, in FIG. 36, suppose a case where the cross traffic flows to the relay N which is recorded on the lowest order in the quality information table. In this case, it would be necessary for all of the relays recorded above the relay N needs to be improved in quality, selected as the relays to be re-measured and be in the high order in the quality information table by sorting. For this reason, there is a problem that setting the number of relays to be re-measured to be small makes the monitoring less up-to-date.

On the other hand, when the number of relays to be re-measured is set to be large, it makes the monitoring more up to date. However, most of the relays on the path will be re-measured. Thus, the ratio of measuring packets in the throughput increases, causing decrease in the efficiency in using the network resource. The overhead caused by the measuring packet is problematic for a network with limited communication resource, such as the wireless IP network.

The first invention of the present application has been conceived to solve the above-described problems in the network monitoring technology, and has an object to achieve a network monitoring technology that allows catching of the sign of congestions on the transmission path in the network system immediately, and tolerant to the change in cross traffic, and suitable for the use under a wireless infrastructure with low network capacity.

The problem due to the exceeding communication capacity caused by the change of the throughput in a network system, and an accompanying problem of the lowered communication quality, for example, may occur in a bus system in a semiconductor processor.

The architecture of the System on a Chip (SoC) or the multi-core processor is configured by connecting multiple cores such as CPU, DSP, RISC, or GPU through a bus system for performing a series of signal processing. For high-speed data transfer, the cores are connected with dedicated buses, and handshake is performed by high-speed control signals. Here, the core in the bus system and the bus between the cores correspond to the peer in the network system and the link between the peers, respectively.

It is necessary to secure the quality by performing control so that the data that does not exceed the transfer capacity of the bus, since the data transfer capacity is different for each bus between the cores, and the amount of transfer data output from the core changes depending on the complexity of the data to be processed such as the spectrum characteristic.

The second invention according to this application is for solving the problem in the technology for detecting the change in the throughput in such a bus system, and its object is to implement a bus system monitoring technology that allows immediately catching the sign indicating that the transfer capacity of the semiconductor processor on the data transfer bus is about to exceed, and that is highly tolerant to the change in the data generating status in each core.

Solution to Problem

In order to solve the problem, the network monitoring device according to the present invention is a network monitoring device which monitors a network in which data is transmitted through a plurality of relays, the network monitoring device including: a monitoring frequency recording unit which records monitoring frequencies each of which represents a monitoring frequency for monitoring a transmission status of a corresponding one of the plurality of relays; a selection probability generating unit which generates selection probability information which is probability values for the plurality of relays; a monitoring object determining unit which determines, according to the monitoring frequency and the selection probability information, a relay the transmission status of which is to be monitored, from the plurality of relays; a transmission status obtaining unit which obtains transmission status information indicating a transmission status on the relay determined by the monitoring object determining unit; a transmission status recording unit which records the transmission status information; an activation level calculating unit which calculates, based on a difference in activation level, which increases in accordance with a correlation between the transmission statuses and the monitoring frequencies of the plurality of relays, indicated by the transmission status information, the activation level indicating suitability of the monitoring on the transmission statuses of the plurality of relays; and a monitoring frequency updating unit which updates, based on a difference in monitoring frequency which increases in accordance with the activation level, the monitoring frequency recorded on the monitoring frequency recording unit.

With this configuration, the monitoring object determining unit selects a relay the transmission status of which is obtained, based on the monitoring frequency of the relays on the data transmission path, recorded on the monitoring frequency recording unit and the selection probability information output from the selection probability generating unit, and the selection is stochastically made.

Through the selection process in each relay, the selection at high probability is made to the relay with a bad transmission status, depending on the difference in the monitoring frequency. However, the relay with a good transmission status is also selected at low probability. In addition, the selection probability information is added with a random probability element to the selection probability distribution determined based on the monitoring frequency.

As described above, using this configuration prevents a fixed selection on a certain relay to be monitored, and increase an expected value of real-time detection of the situation in which a sudden cross traffic is generated in any relay.

In addition, instead of obtaining the transmission status information from multiple relays at high frequency, sequentially selecting a series of relays determined by the monitoring object determining unit limits the increase in the number of measuring packet, and achieving relay monitoring without increasing the load on the network in a wireless IP network configured with low-speed links.

Furthermore, a bus system monitoring device according to the present invention is a bus system monitoring device to which a plurality of signal processors are connected and which transmits data processed by the plurality of signal processors, the bus system monitoring device including: a monitoring frequency recording unit which records monitoring frequencies each of which represents a monitoring frequency for a data generation status of a corresponding one of the plurality of signal processors; a selection probability generating unit which generates selection probability information which is probability values for the plurality of signal processors; a monitoring object determining unit which determines, according to the monitoring frequency and the selection probability information, a signal processor the data generation status of which is to be monitored; a generated data amount obtaining unit which obtains generated data amount information indicating a data generation status on the signal processor determined by the monitoring object determining unit; a generated data amount recording unit which records the generated data amount information; an activation level calculating unit which calculates, based on a difference in activation level, which increases in accordance with a correlation between data amount generated in each signal processor and the monitoring frequencies of the plurality of signal processors, indicated by the generated data amount information, the activation level indicating suitability of the monitoring on the data generation statuses of the plurality of signal processors; and a monitoring frequency updating unit which updates, based on a difference in monitoring frequency which increases in accordance with the activation level, a monitoring frequency recorded on the monitoring frequency recording unit.

With this configuration, it is possible to achieve a bus system monitoring device capable of achieving the effect equivalent to the network monitoring device.

Note that, the present invention can not only be implemented as such a network monitoring device and a bus system monitoring device, but also as a network monitoring method and a bus system monitoring method. Furthermore, the present invention can also be implemented as a program which implements the network monitoring method and a bus system monitoring method by a computer.

Advantageous Effects of Invention

According to the present invention, in a network application such as a media transmission in which the change in throughput decreases the quality of service, it is possible to find out the status of transmission path robust to unexpected change in throughput and limiting the load on the network by the measuring packet necessary for monitoring the relays to the minimum, by stochastically performing the selection of the relay to be monitored.

BRIEF DESCRIPTION OF DRAWINGS

FIG. 8 illustrates an example of data configuration of the transmission status information table according to the first embodiment.

FIG. 14 illustrates an example of data configuration of the monitoring frequency table according to the first embodiment.

FIG. 16 illustrates an example of the data configuration for recording the normalized monitoring frequency according to the first embodiment.

FIG. 23 illustrates an example of data configuration of the generated data amount information table according to the second embodiment.

FIG. 29 illustrates an example of the format of the notification request packet according to the third embodiment.

FIG. 30 illustrates an example of the format of the notification packet according to the third embodiment.

FIG. 34 illustrates an example of data configuration for recording the monitoring frequency according to the fourth embodiment.

DESCRIPTION OF EMBODIMENTS

Embodiment 1

The following describes embodiments of the present invention with reference to the drawings.

First Embodiment

Figure 1:
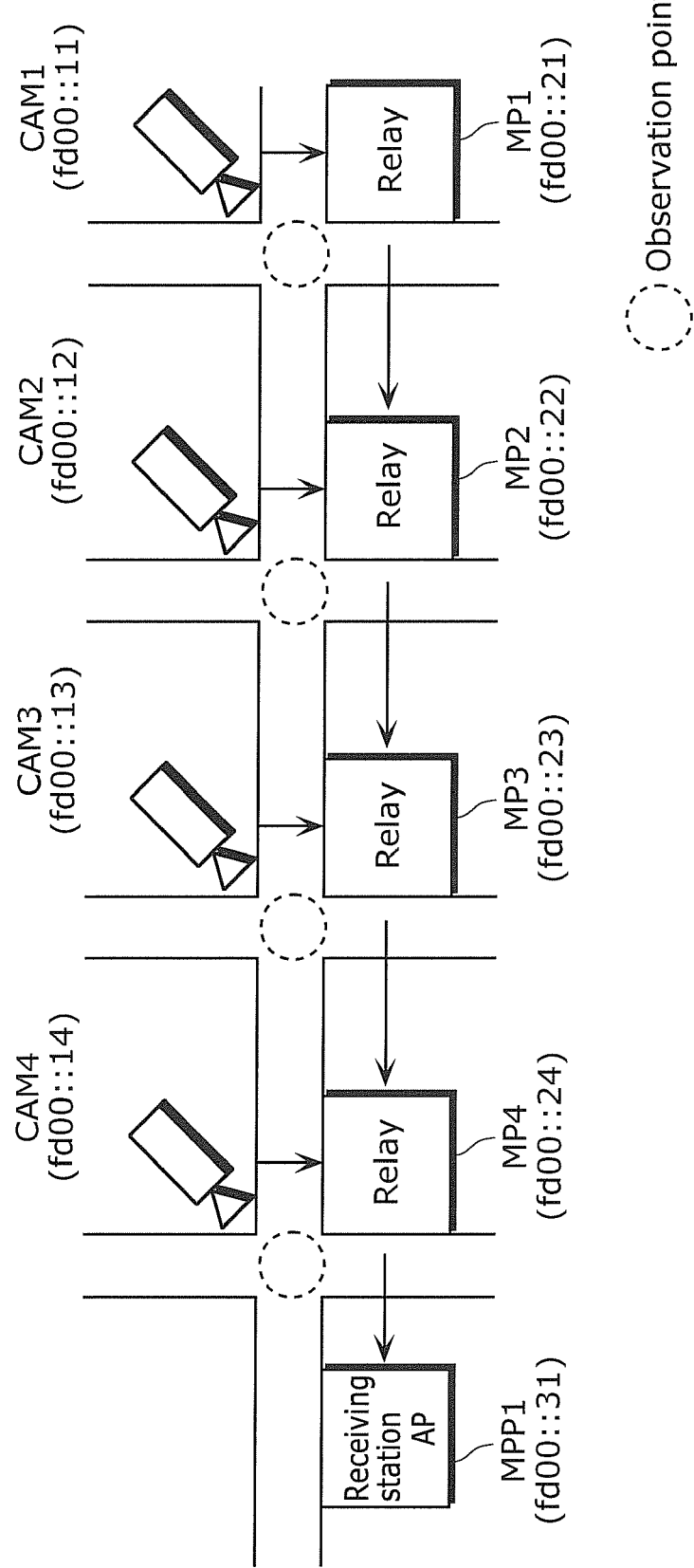
FIG. 1 is a schematic diagram illustrating the configuration of the video transfer system according to the first embodiment.

FIG. 1 is a schematic diagram illustrating the configuration of the video transfer system as an example of object to be monitored according to the first embodiment. The video transfer system includes cameras installed in areas where the monitoring for safety is necessary, such as downtown or route to and from school. The video transfer system is a type of security system that supports safety through remote monitoring performed by transmitting the video captured by the cameras to the center station through the network.

In FIG. 1, CAM1 to CAM4 are cameras installed at respective intersections for capturing video at the intersections. MP1 to MP4 are relays installed at respective intersections. MPP is an Access Point (AP) of the receiving station. The devices are connected by a wireless ad-hoc network which can be easily installed.

The capturing ranges of the cameras are shown in broken line in FIG. 1. The video at the intersections captured by the CAM1 to CAM4 is transmitted to the nearest relay, and transmitted to the receiving station through the relays by multi-hop communication.

Though not shown in the diagram, it is assumed that the video is transmitted from the receiving station AP to the center station, using the bandwidth-guaranteed New Generation Network (NGN), for example. For the wireless ad hoc network, mesh communication infrastructure such as IEEE 802.11s capable of multi-hop communication can be used.

In such a network configuration, the end-to-end throughput value from the camera as the transmitter to the receiving station access point as the receiver is not constant but changing.

Figure 2:
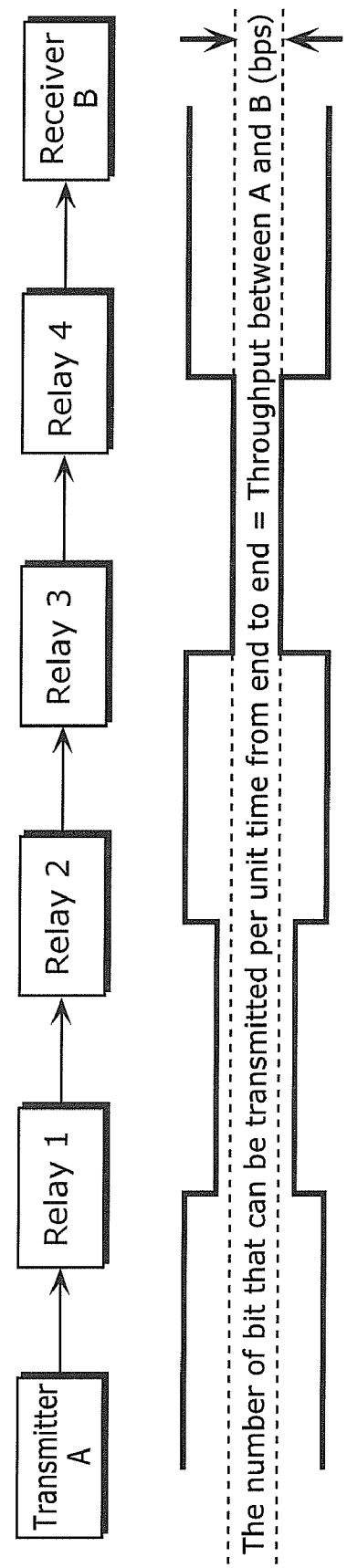
FIG. 2 describes the change in the throughput value.

FIG. 2 illustrates the change in the throughput value, showing the data transmitted from the transmitter A to the receiver B through four relays relay 1 to relay 4. Here, the relays 1 to 4, the transmitter A, and the receiver B correspond to the relays MP1 to MP4, the camera CAM1, and the receiving station access point MPP1, respectively.

The throughput of five links, that is, between the transmitter and relay 1, between the relay 1 and relay 2, between the relay 2 and relay 3, between the relay 3 and relay 4, and between the relay 4 and the receiver are usually different due to the difference in the bandwidth allocated to the communication interfaces of the relays and the influence of the cross traffic. As a result, the throughput between the transmitter and the receiver is the throughput of the link between the relay 3 and relay 4, the narrowest link of all.

The effect in the service quality due to the change in the throughput usually appears in a wireless section where the bandwidth is not guaranteed.

In FIG. 1, the transmission path of the video transmitted from the camera CAM1 to CAM4 is determined by the path control protocol between the relays MP1 to MP4.

For example, the camera video from the CAM1 is transmitted to the MPP1, sequentially passing through the four relays, MP1, MP2, MP3, and MP4. The camera video captured by the CAM2 is transmitted to the MPP1, sequentially passing through the three relays, MP2, MP3, and MP4. The camera video captured by the CAM3 is transmitted to the MPP1, sequentially passing through the two relays, MP3 and MP4. The camera video captured by the CAM4 is transmitted to the MPP1 through the MP4.

The transmission paths are illustrated by arrows in FIG. 1. In addition, the IP addresses allocated to the devices are indicated in the brackets in FIG. 1.

Figure 3:
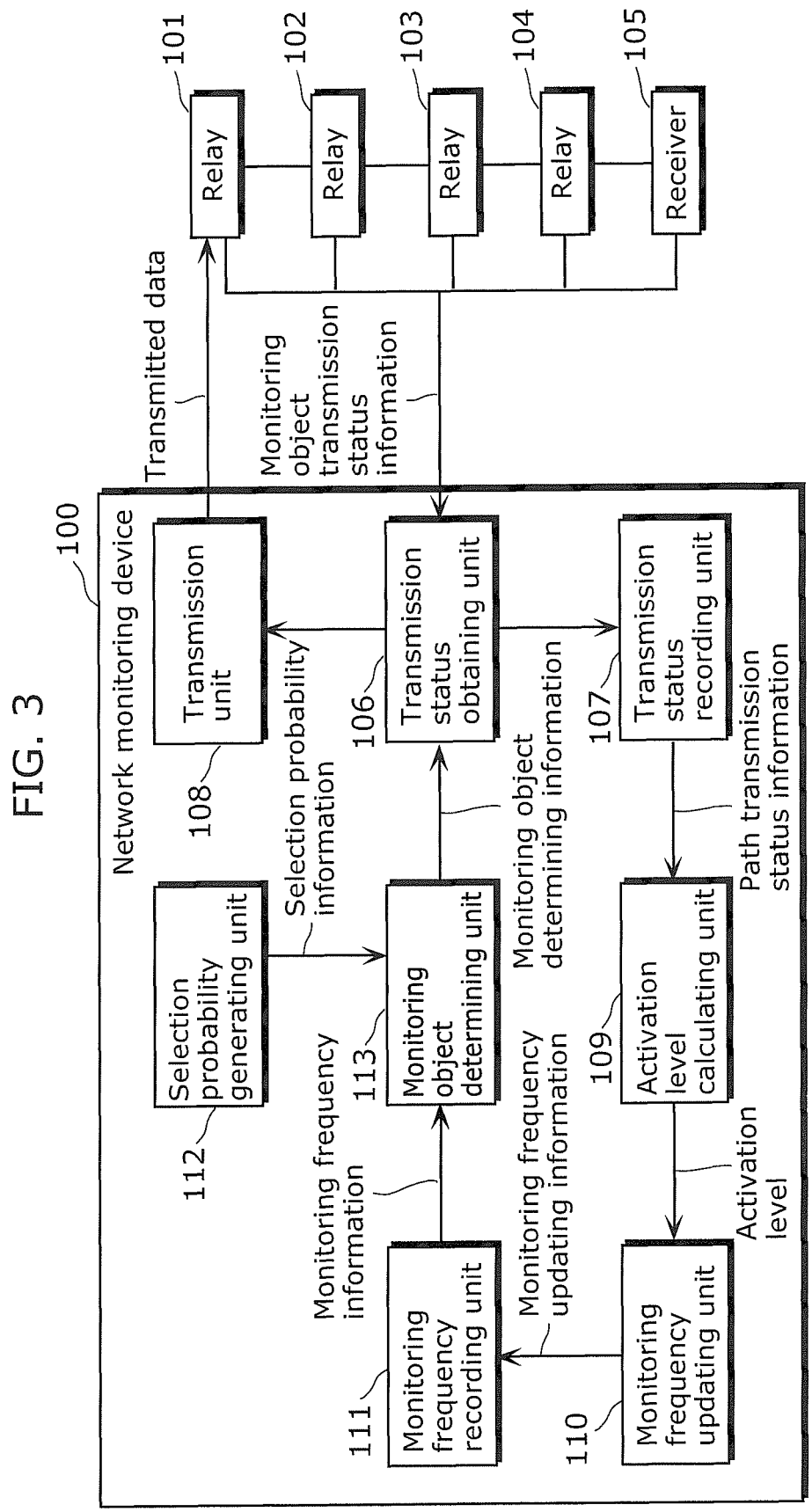
FIG. 3 is a functional block diagram illustrating an example of the configuration of the network monitoring device according to the first embodiment.

FIG. 3 is a functional block diagram illustrating the major components of the camera CAM1 to CAM4 as a transmitter (especially, as the network monitoring device). FIG. 3 illustrates the main component of the camera as the network monitoring device 100. The configuration illustrated in FIG. 3 is common to all of the cameras CAM1 to CAM4.

The network monitoring device 100 which is the main component of the camera includes a transmission status obtaining unit 106, a transmission status recording unit 107, a transmission unit 108, an activation level calculating unit 109, a monitoring frequency updating unit 110, a monitoring frequency recording unit 111, a selection probability generating unit 112, and a monitoring object determining unit 113. Note that, in FIG. 3, illustration of the configuration for implementing the capturing function of the camera is omitted.

Take the CAM1 for example, the MP1, the MP2, the MP3, and the MP4 in FIG. 1 corresponds to the relay 101, the relay 102, the relay 103, and the relay 104, respectively, and the reception access point MPP1 in FIG. 1 corresponds to the receiver 105 in FIG. 3.

Figure 4:
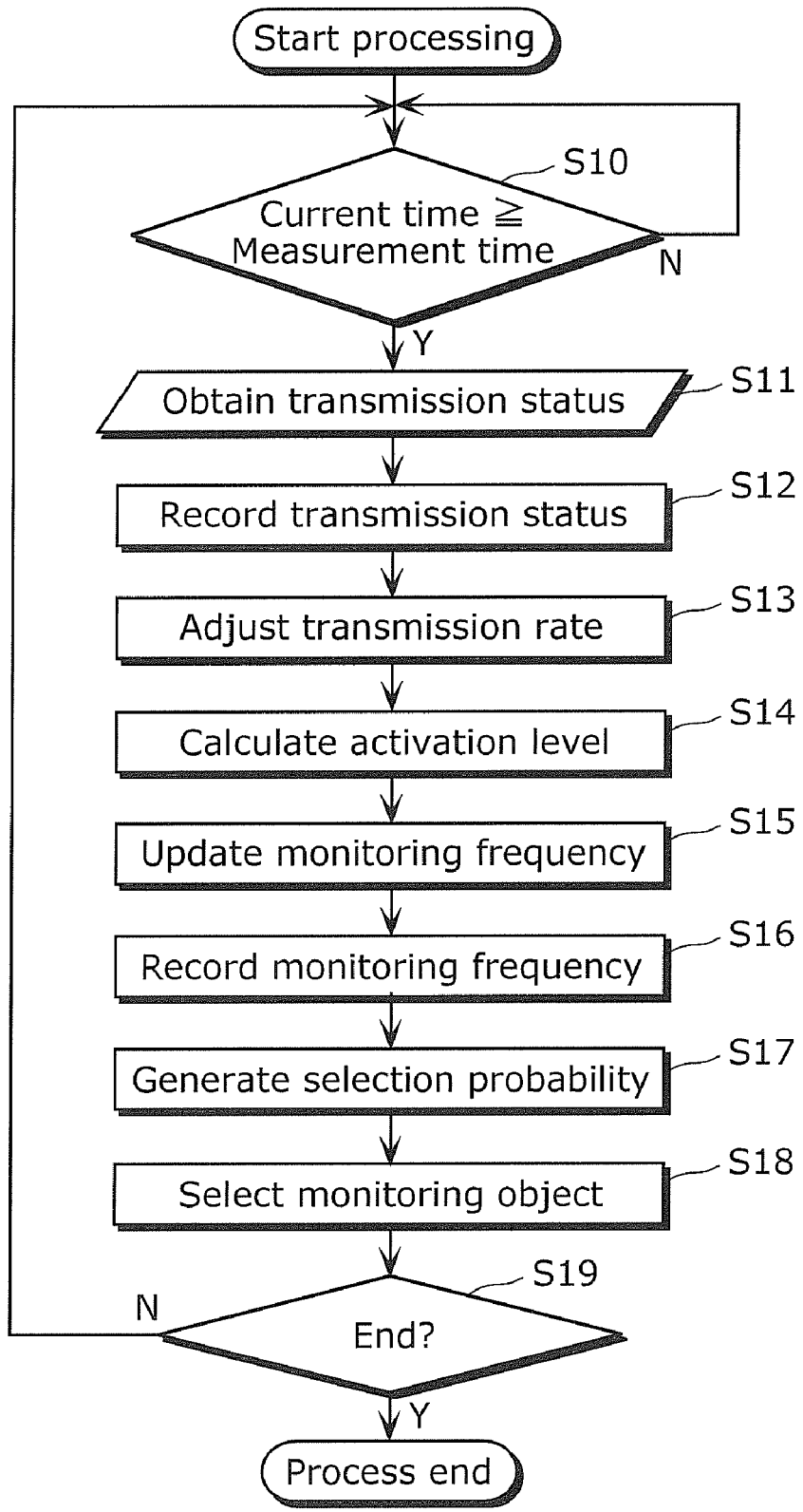
FIG. 4 is a flowchart illustrating an example of the network monitoring process according to the first embodiment.

FIG. 4 is a flowchart illustrating an example of the process performed by the network monitoring device 100. At the time when the current time matches or has passed the measurement time (Y in S10), the transmission status obtaining unit 106 obtains the transmission status (S11), and the obtained transmission status is recorded by the transmission status recording unit 107 (S12). The transmission status is obtained by issuing the measuring packet. The timing for checking the status of the transmission path is typically performed at a constant cycle. However, the timing may be determined according to another time schedule.

The transmission unit 108 detects the change in throughput according to the transmission status of the path, and adjusts the transmission condition of the video data such as the bit rate, frame rate, or screen resolution (S13). The activation level calculating unit 109 calculates the activation level based on the correlation between the transmission status information and the current monitoring status (S14). The monitoring frequency 110 updates the monitoring frequency of each relay on the path based on the activation level (S15). The monitoring frequency recording unit 111 records the updated value (S16).

The selection probability generating unit 112 generates the selection probability information (S17). The monitoring object determining unit 113 determines the relay to be monitored according to the monitoring frequency recorded by the monitoring frequency recording unit 111 and the selection probability information generated by the selection probability generating unit 112 (S18).

Repeatedly performing the series of process as an iteration until the instruction for ending the process is received (N in S19) allows sufficient monitoring to all of the relays while weighting the monitoring frequency of the relays.

The following specifically describes the operation performed by each component for achieving the effect of the present invention using the camera CAM1 as an example.
(Transmission Status Obtaining Unit 106)

The transmission status obtaining unit 106 obtains the transmission status information from the relay on the transmission path selected by the monitoring object determining unit 113.

In consideration of the application to a security system, not being able to transmitting the video to be monitored due the throughput change (especially congestion) in a wireless period is problematic in terms of function. Thus, it is desirable to be able to detect the sign of congestion on the transmission path as quickly as possible.

Generally, various quality measures such as the RTT, the delay fluctuation, the packet loss rate and others are possible transmission status information that can be obtained from the relay. However, for a purpose of limiting the interruption on the transmission video due to lost packet to the minimum, the most effective method is to use the RTT that allows detecting the sign of congestion before the packet loss is actually generated.

Figure 5:
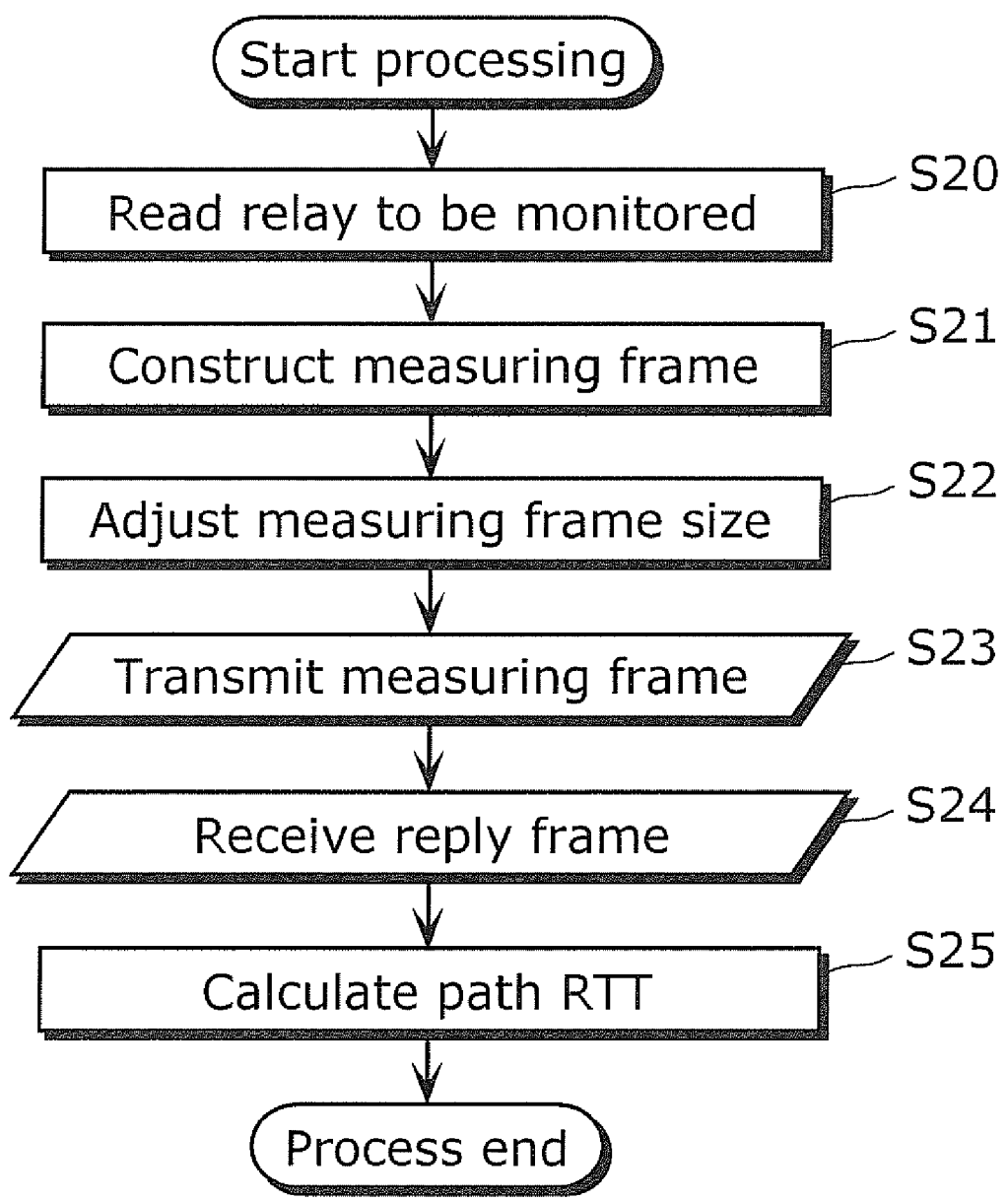
FIG. 5 is a flowchart illustrating an example of the transmission status obtaining process according to the first embodiment.

FIG. 5 is a flowchart illustrating an example of the process performed by the transmission status obtaining unit 106.

The transmission status obtaining unit 106 reads the monitoring object determining information determining unit 113 for determining the relay to be monitored by the monitoring object determining unit 113 (S20). The characteristic method for the monitoring object determining unit 113 to determine the relay to be monitored shall be described later. The transmission status obtaining unit 106 issues measuring packet for the relay determined by the read monitoring object specifying information (S21 to S23), receive the reply packet (S24), and calculates the RTT of the relay to be monitored (S25).

Figure 6:
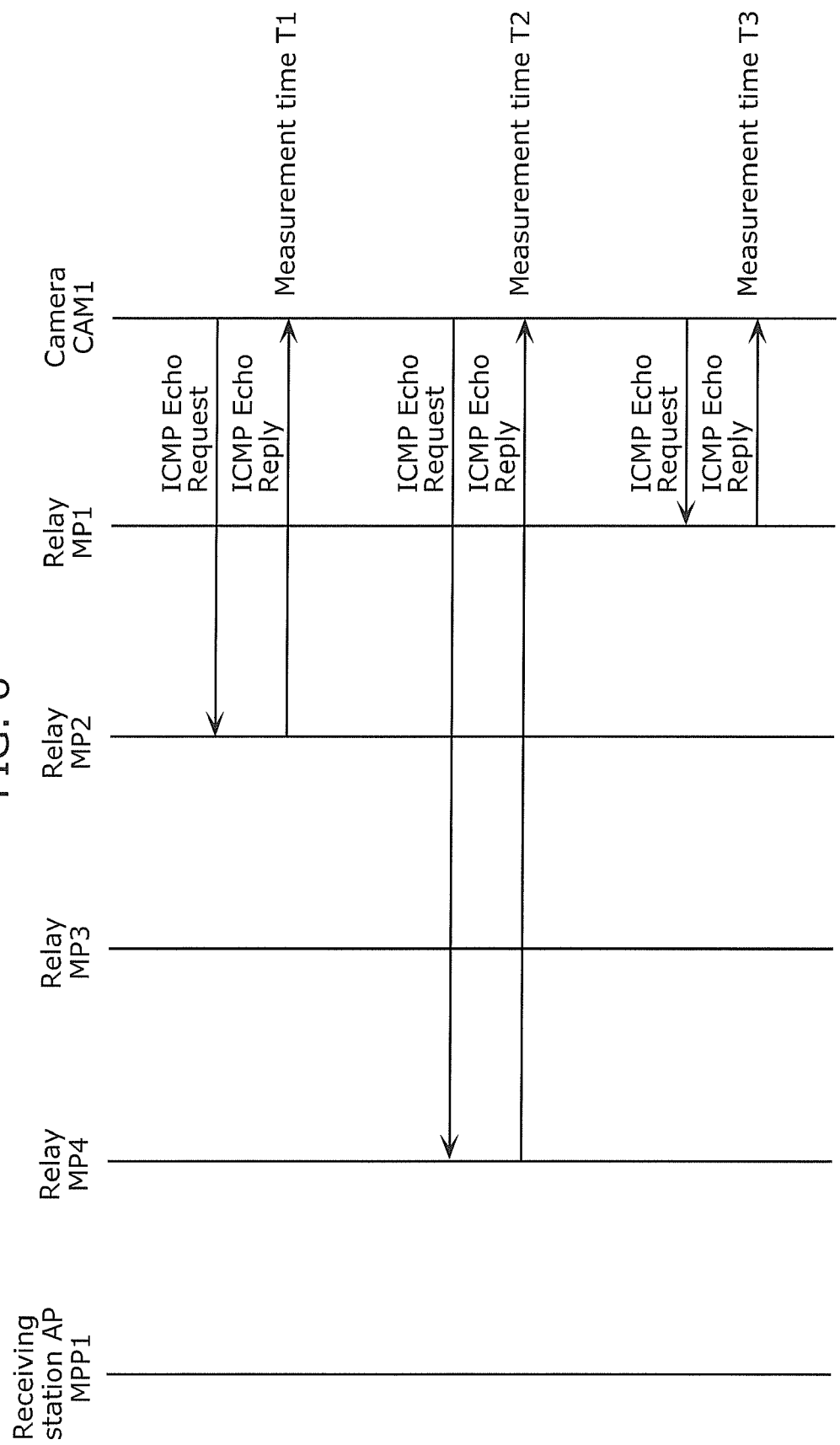
FIG. 6 is a diagram illustrating a data flow in an example of RTT measuring operation according to the first embodiment.

FIG. 6 is a data flow illustrating an example of an operation for measuring the RU. In FIG. 6, the process illustrated in FIG. 5 is performed for three times.

In the measurement time T1, the relay MP2 is determined to be the relay to be monitored. In the measurement time T2, the relay MP4 is determined to be the relay to be monitored. In the measurement time T3, the relay MP1 is determined to be the relay to be monitored. In each measurement time, the camera CAM1 issues a measuring packet to the determined relay to be monitored, and receives the reply packet.

Figure 7:
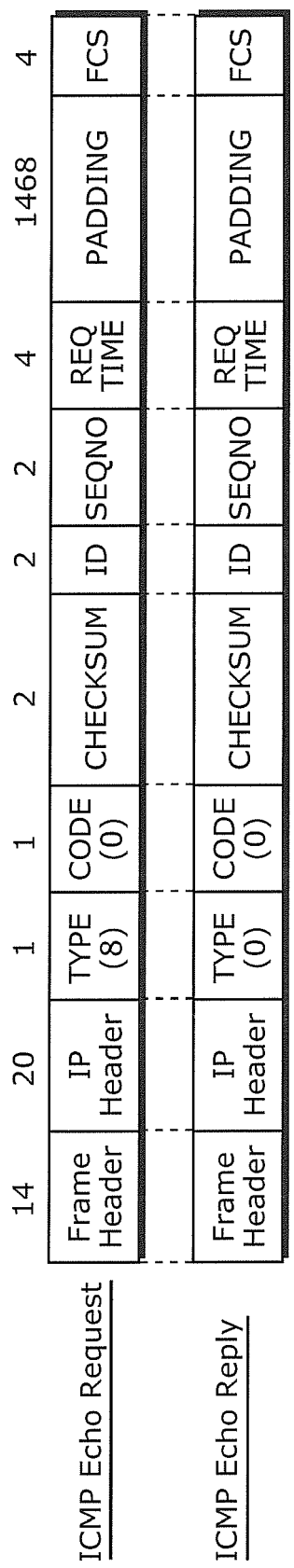
FIG. 7 illustrates an example of the measuring packet and reply packet according to the first embodiment.

FIG. 7 illustrates an example of the format of measuring packet and reply packet. As illustrated in FIG. 7, Echo Request and Echo Reply implemented in the ICMP protocol may be used as the measuring packet and the reply packet.

The camera CAM1 records the transmission time of the measuring packet in REQ TIME field in the Echo Request. The relay to be monitored copies the content of the REQ TIME field in the received Echo Request to the REQ TIME field in the Echo Reply, and sends the Echo reply. The camera 1 which received the Echo Reply can calculate the RTT of the relay to be monitored by calculating the difference between the reception time and the transmission time copied in the REQ TIME field.

The measured value of the RTT depends on the packet length of the data to be transmitted. Thus, the packet size of the measuring packet is adjusted to the packet size for transmitting the video data, by adding stuffing of an appropriate size to PADDING field in the Echo Request. When sending the video data in a frame of 1518 bytes, the stuffing of 1468 bytes adjusts the packet size of the Echo Request packet to 1518 bytes.
(Transmission Status Recording Unit 107)

The transmission status obtaining unit 106 records the calculated value of RTT of the relay to be monitored to the transmission status information table provided in the transmission status recording unit 107.

FIG. 8 illustrates an example of the data configuration of the transmission status information table.

In the transmission status information table, the hop counts counted from the relays on the camera side of the path are recorded in the first column. IP addresses of the relays are recorded in the second column. The path RTTs are recorded in the third column, and the value of the RTT obtained by the transmission status obtaining unit 106 is recorded per millisecond. The link RTTs are recorded in the fourth column, each of which represents delay time that occurs for a round trip between adjacent relays, and is an index representing the delay of the relay.

The link RTTs are calculated, as the difference between a pair of the path RTTs, by subtracting the path RTT of the relay one hop less than the relay from the path RTT of the relay. Here, the path RTT and the link RTT of the relay with a hop count of one are equal.

(Transmission Unit 108)

The transmission unit 108 codes and transfers the captured video, determines the appropriate rate of observed traffic data based on the transmission status information table, and controls the transmission rate such that the actual transmission rate becomes closer to the appropriate rate.

Figure 9:
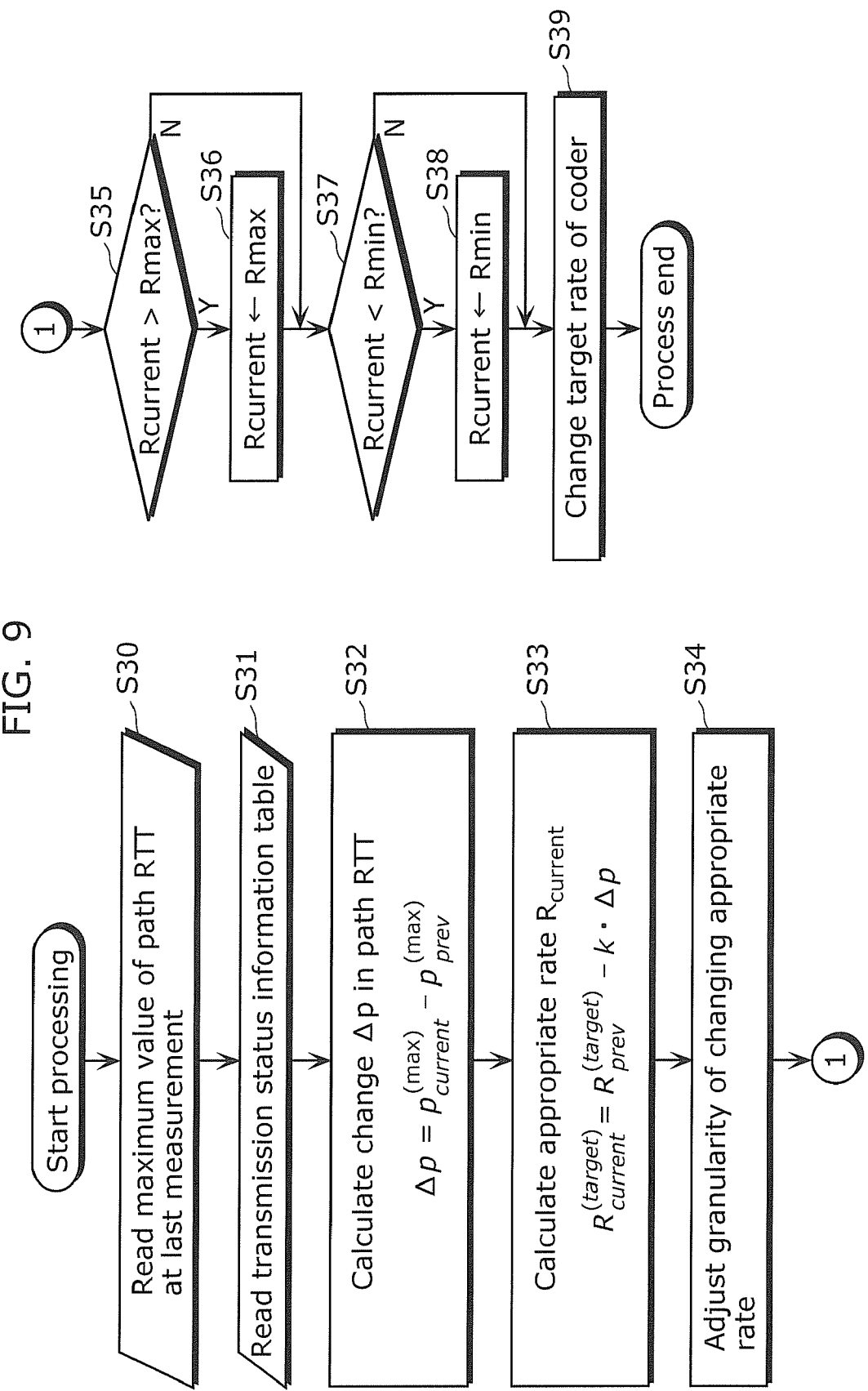
FIG. 9 is a flowchart illustrating an example of the transmission process according to the first embodiment.

FIG. 9 is a flowchart illustrating an example of the process performed by the transmission status obtaining unit 108.

The Variable Bitrates (VBR) coding scheme of the Motion Picture Expert Group (MPEG) can be used for the coding scheme of the video.

The maximum value $p_{current}$ of the path RTT on the transmission status information table is read for adjusting the transmission rate. When $\Delta p$ denotes the difference between $p_{current}$ and $p_{prev}$, the maximum value of the path RTT at the time of last measurement, $\Delta p$ is given by the following equation (S30 to S32).

[Equation 2]

$$\Delta p = p_{current}^{(max)} - p_{prev}^{(max)} \quad \text{(Equation 2)}$$

The appropriate rate $R_{current}$ with respect to $R_{prev}$ can be controlled according to the following dynamics, the current transmission rate adjusted at the time of last measurement.

[Equation 3]

$$R_{current}^{(target)} = R_{prev}^{(target)} - k \cdot \Delta p \quad \text{(Equation 3)}$$

The coefficient k is for determining a speed for adjusting the rate (S33).

The adjustment granularity of the rate is restricted depending on the method. For example, in the case of MPEG2, the adjustment can be performed per 400 bps (S34). Note that, at the time of practical use, the target rate calculated by the equation 3 is restricted by the minimum bitrates value and the maximum bitrates value defined by the system (S35 to S38). the target rate of the coder in the transmission unit 108 is changed to the target rate after the restriction (S39).

(Activation Level Calculating Unit 109)

Figure 10:
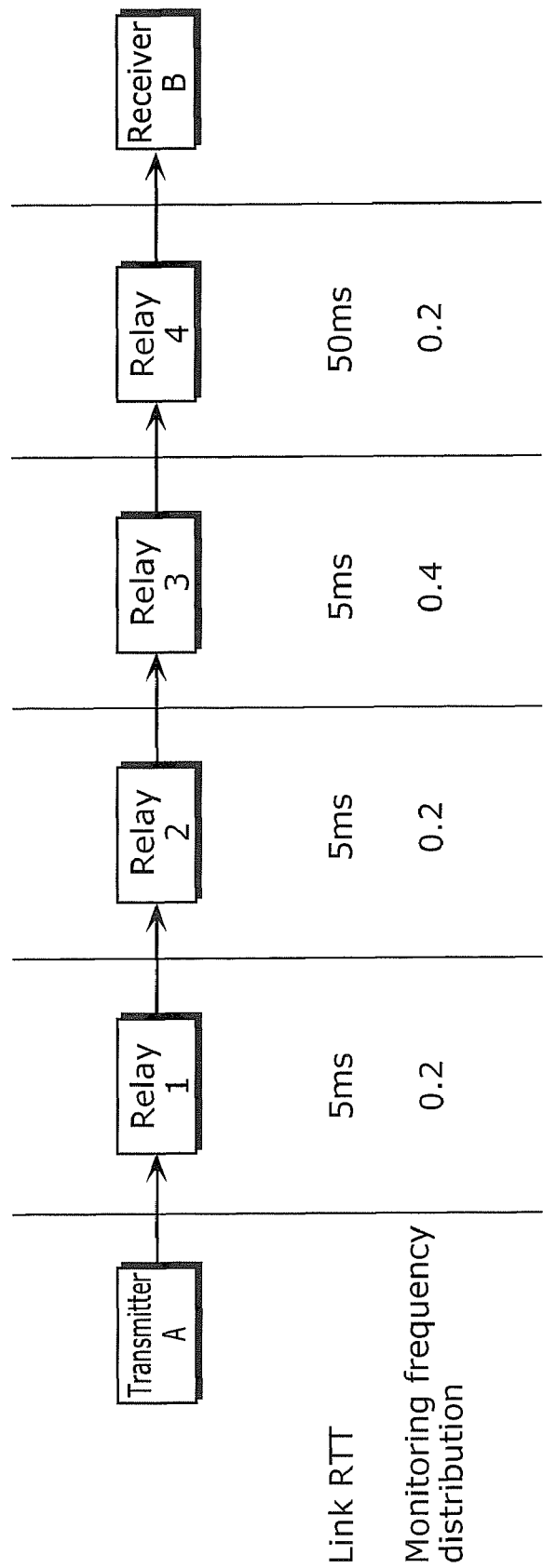
FIG. 10 illustrates a relationship between the monitoring frequency distribution and the transmission load status according to the first embodiment.
Figure 11:
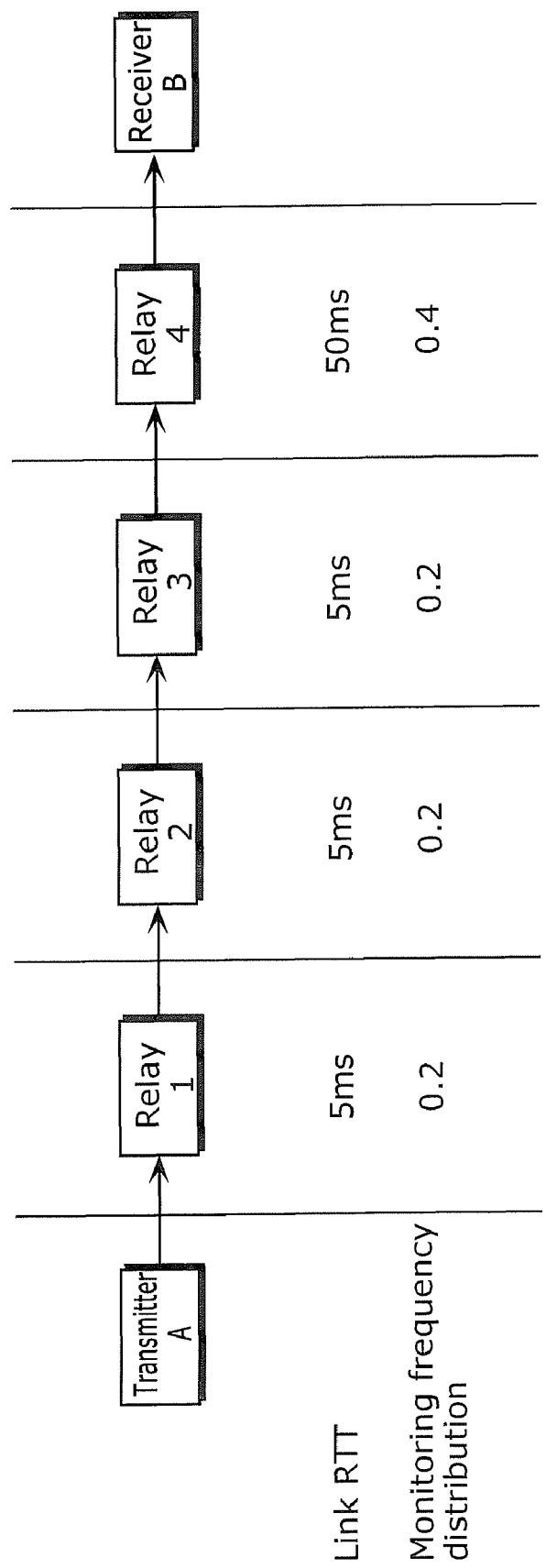
FIG. 11 illustrates a relationship between the monitoring frequency distribution and the transmission load status according to the first embodiment.

FIGS. 10 and 11 illustrate the relationship between the monitoring frequency distribution and the transmission load status.

In FIG. 10, the transmission status of the relay 1 to the relay 3 is good among the four relays on the path. Meanwhile, the RU of the relay 4 is 10 times higher than those of the other relays, which indicates a bad transmission status.

However, the relay monitored highly frequently is the relay 3, and the monitoring frequency of the relay 4 is equivalent to those of the relay 1 and the relay 2 with the good transmission status. The monitoring frequency here indicates the frequency of the relay being selected as the relay to be monitored.

The relationship in this case is assumed that the monitoring frequency distribution does not match the transmission load status of the relay on the path, and the status is defined as a low monitoring accuracy.

In FIG. 11, the monitoring frequency of the relay 4 with the worst transmission status among the other relays is the highest, and the monitoring frequencies are the other three relays are low.

Such a relationship is defined as having a high monitoring accuracy.

The higher the monitoring frequency, the relay to be monitored suitable for the transfer load status of the relay on the path is more likely to be selected. Thus, it is possible to understand the load status on the path more precisely.

The activation level α is an index indicating how well the current monitoring frequency distribution to the relays reflect the transmission load status on the data transmission path.

Figure 12:
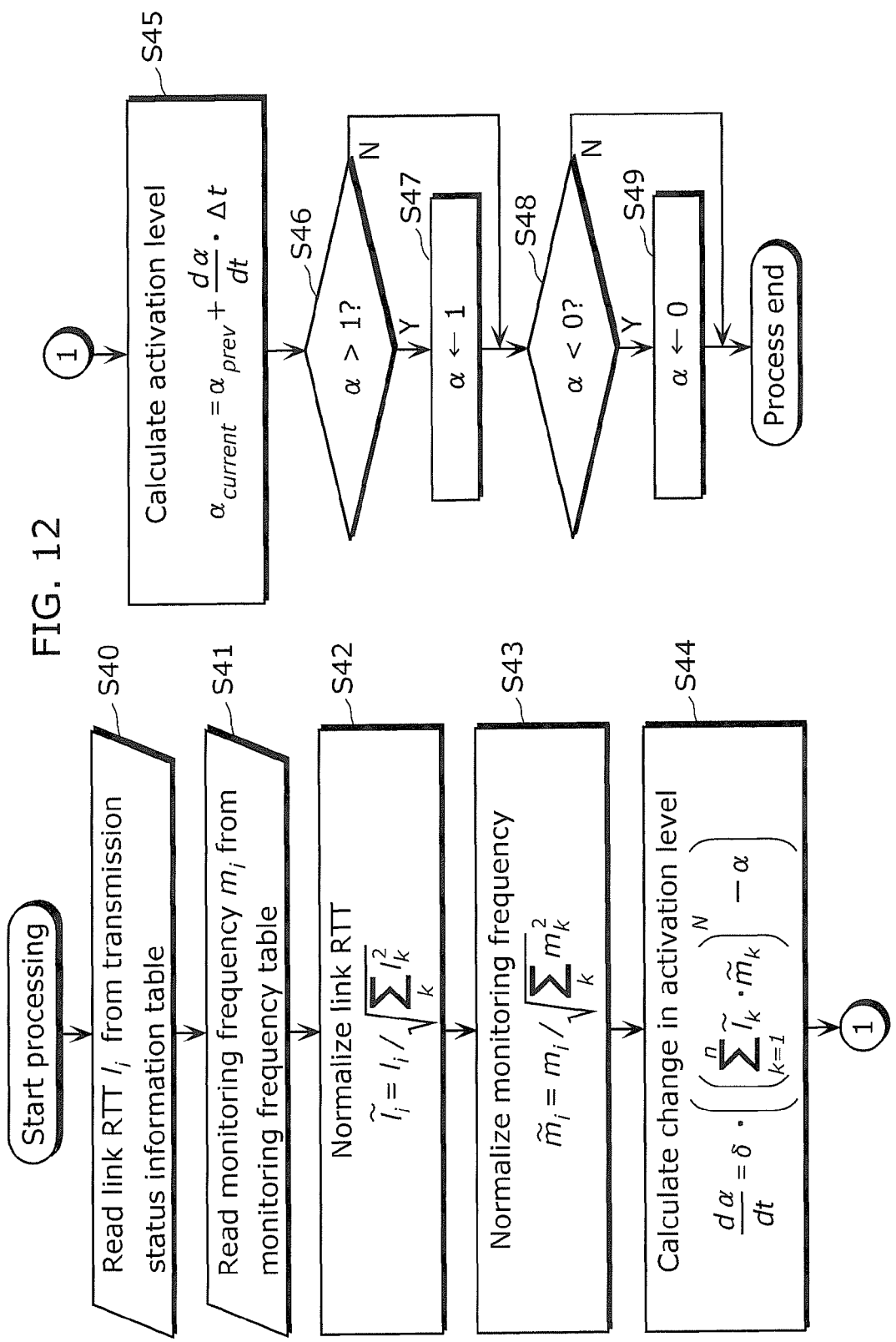
FIG. 12 is a flowchart illustrating an example of the activation level calculating process according to the first embodiment.

FIG. 12 is a flowchart illustrating an example of the process performed by the activation level calculating unit 109.

The activation level calculating unit 109 reads the link RTT $l_i$ from the transmission status information table (S40), reads the monitoring frequency $m_i$ from the monitoring frequency table in the monitoring frequency recording unit 111 (S41), and calculates the change in the activation level α according to Equation 4, using the read link RTT and the monitoring frequency (S42 to S44).

[Equation 4]

$$\frac{d\alpha}{dt} = \delta \cdot \left( \left( \sum_{k=1}^{n} \tilde{l}_k \cdot \tilde{m}_k \right)^N - \alpha \right) \quad \text{(Equation 4)}$$

Equation 4 is an example of the definition of the dynamics of the activation level α. The letter n denotes the number of relay on the transmission path, $l_i$ denotes the link RTT of the relay of the hop count i recorded on the transmission status information table, $m_i$ denotes a monitoring frequency assigned to the relay, and N and δ denote the constant controlling the change speed of the dynamics. The item of product-sum operation of the link RTT and the monitoring frequency indicates the degree of correlation between them.

The tildes above $l_i$ and $m_i$ denote that they are normalized, that is, in the relationships shown in FIG. 5 and FIG. 6.

[Equation 5]

$$\tilde{l}_i = l_i \Big/ \sqrt{\sum_k l_k^2} \quad \text{(Equation 5)}$$

[Equation 6]

$$\tilde{m}_i = m_i \Big/ \sqrt{\sum_k m_k^2} \quad \text{(Equation 6)}$$

The activation level α is updated according to Equation 7, using the change in the activation level α calculated by Equation 4 (S45) Here, Δt denotes a time interval determined by the updating cycle.

[Equation 7]

$$\alpha_{current} = \alpha_{prev} + \frac{d\alpha}{dt} \cdot \Delta t \quad \text{(Equation 7)}$$

The variance range of the activation level α is restricted to a closed interval between 0 and 1, for ease of handling (S46 to S49). With this restriction, the activation level α takes a real-value between 0 and 1 inclusive.

The activation level α close to 0 corresponds to low monitoring accuracy, while the activation level α close to 1 corresponds to high monitoring accuracy. This is because, according to the dynamics of Equation 4, the activation level α becomes close to 1 as the monitoring status distribution of the group of relays on the transmission path comes close to the preferable status, and becomes close to 0 as the monitoring status distribution of the relay deviates from the transfer load status of the relay.

(Monitoring Frequency Updating Unit 110)

The monitoring frequency updating unit 110 updates the monitoring frequency $m_i$ for each relay on the transmission path, based on the value of the activation level α determined by the activation level calculating unit 109.

Figure 13:
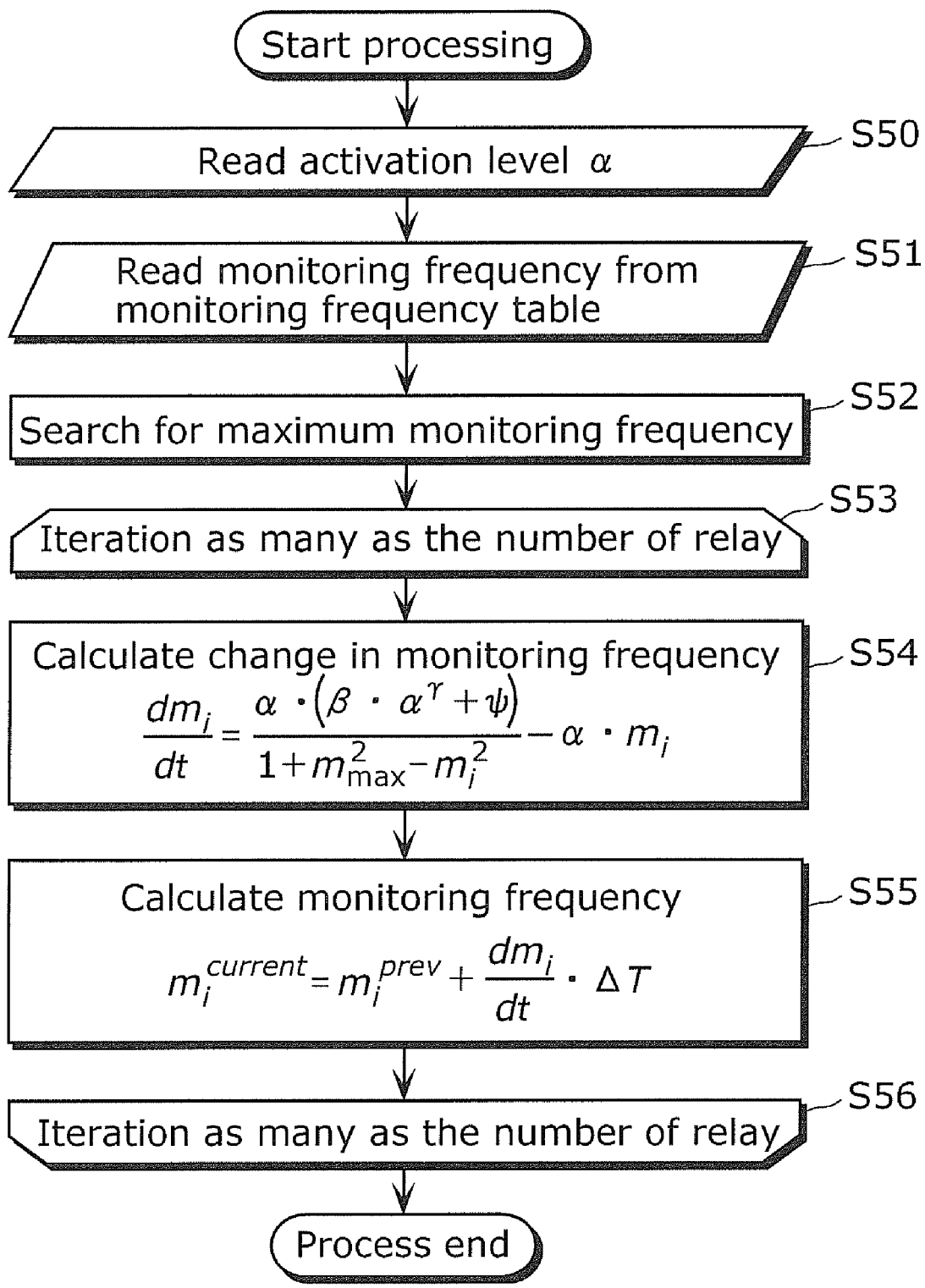
FIG. 13 is a flowchart illustrating an example of the monitoring frequency updating process according to the first embodiment.

FIG. 13 is a flowchart illustrating an example of the process performed by the monitoring frequency updating unit 110.

The monitoring frequency updating unit 110 reads the activation level α determined from the activation level calculating unit 109 (S50), reads the monitoring frequency $m_i$ from the monitoring frequency table in the monitoring frequency recording unit 111 (S51), and searches for the maximum value $m_{max}$ of the monitoring frequency (S52). The monitoring frequency updating unit 110 calculates a new monitoring frequency for each relay, using the read activation level α, the monitoring frequency $m_i$, and the maximum value $m_{max}$ of the monitoring frequency (S53 to S56).

Further description shall be made on the calculation of the monitoring frequency.

Equation 8 is an example of the definition of the dynamics of the monitoring frequency $m_i$, and β, γ, and Ψ in Equation 8 are constants for controlling the speed of change in the dynamics.

[Equation 8]

$$\frac{dm_i}{dt} = \frac{\alpha \cdot (\beta \cdot \alpha^\gamma + \varphi)}{1 + m_{max}^2 - m_i^2} - \alpha \cdot m_i \quad \text{(Equation 8)}$$

According to the Non-Patent Literature 2, it is known that the steady-state solution of the nonlinear ordinary differential equation for the relay with the maximum updating frequency value is Equation 9.

[Equation 9]

$$m_i = \beta \cdot \alpha^\gamma + \varphi \quad \text{(Equation 9)}$$

Furthermore, Equation 10 shows the steady-state solution for the other relays.

[Equation 10]

$$m_i = \frac{1}{2}\left[\sqrt{4 + (\beta \cdot \alpha^\gamma + \varphi)^2} - (\beta \cdot \alpha^\gamma + \varphi)\right] \quad \text{(Equation 10)}$$

The change in the monitoring frequency $m_i$ is calculated according to Equation 8, and the monitoring frequency is updated according to Equation 11, using the calculated change in the monitoring frequency $m_i$. Here, ΔT denotes a time interval determined by the updating cycle.

[Equation 11]

$$m_i^{current} = m_i^{prev} + \frac{dm_i}{dt} \cdot \Delta T \quad \text{(Equation 11)}$$

(Monitoring Frequency Recording Unit 111)

The monitoring frequency recording unit 111 records and manages the monitoring frequency $m_i$ corresponding to each relay on the transmission path, calculated by the monitoring frequency updating unit 110.

FIG. 14 illustrates an example of the data configuration of the monitoring frequency table.

The hop counts of the relays are recorded in the first column, the IP addresses are recorded in the second column, and the values of the monitoring frequency $m_i$ of each relay calculated by the monitoring frequency updating unit 110.

(Selection Probability Generating Unit 112)

The selection probability generating unit 112 generates selection probability information which is a random number necessary for introducing the stochastic behavior to the selection mechanism, according to the timing for selecting the relay to be monitored. Although it is preferable that the selection probability values are random numbers, they may be substituted by pseudorandom numbers which can be generated relatively easily. The probability distribution used in that case may be a general uniform distribution or Gaussian distribution.

The range of the change in the selection probability information may be determined by Equation 9 and Equation 10. When it is assumed that the activation level α is 0, the distance D between the solutions is given by Equation 12.

[Equation 12]

$$D = 0.5 \cdot \left(1 - \sqrt{\varphi^2 + 4}\right) \quad \text{(Equation 12)}$$

With this, the selection probability information $\eta_i$ is determined as in Equation 13.

[Equation 13]

$$\eta_i = \text{Random} \quad \text{(Equation 13)}$$
$$(i)\left[-0.25 \cdot \left(\kappa + 1 - \sqrt{\varphi^2 + 4}\right), +0.25 \cdot \left(\kappa + 1 - \sqrt{\varphi^2 + 4}\right)\right]$$

Random function generates actual random numbers or pseudorandom numbers within a predetermined range, and K is the adjustment factor with the value equal to or more than 0. Increasing K can increase the amplitude of the selection probability information to be generated.

(Monitoring Object Determining Unit 113)

Figure 15:
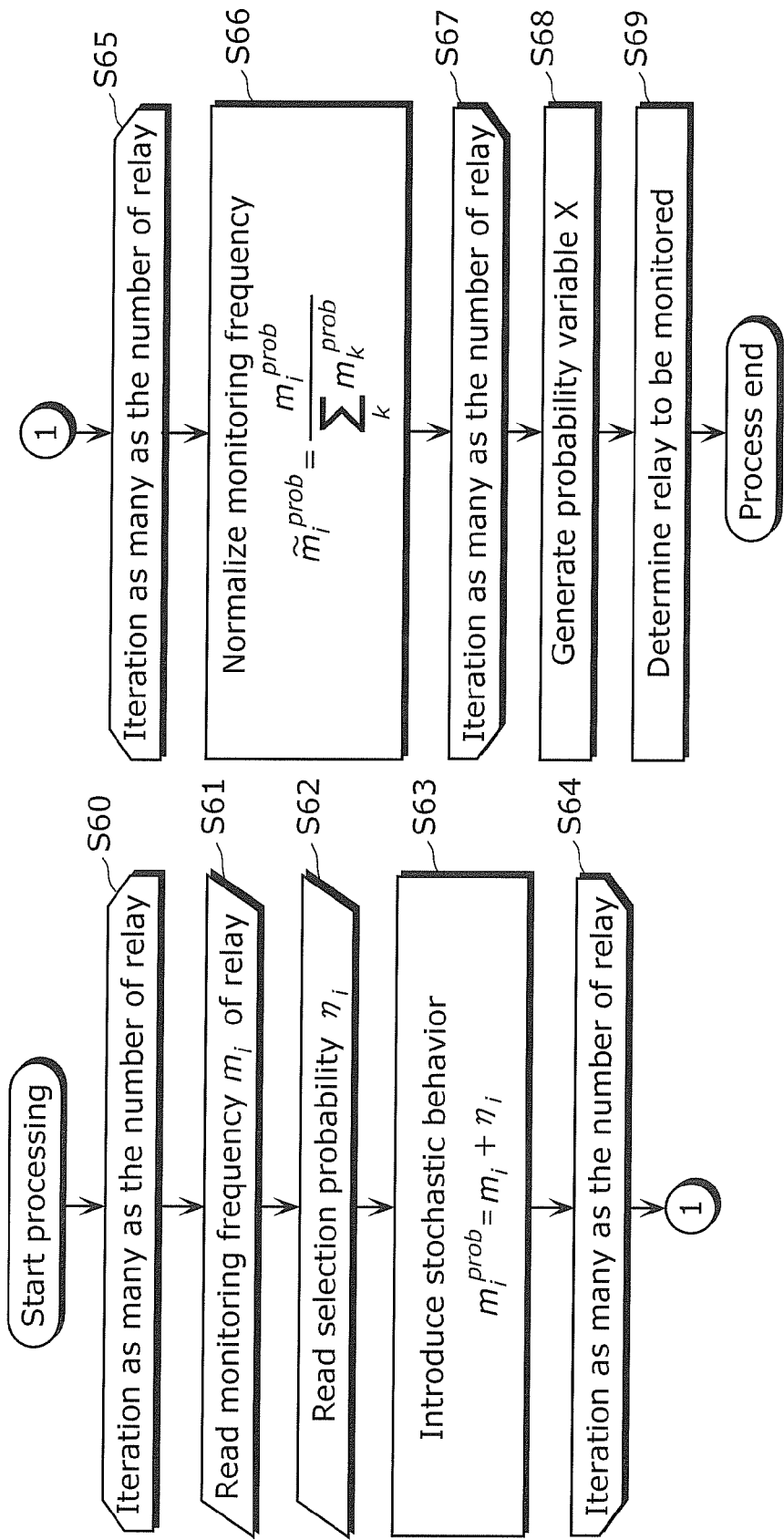
FIG. 15 is a flowchart illustrating an example of the monitoring object determining process according to the first embodiment.

FIG. 15 is a flowchart illustrating an example of the process performed by the monitoring object determining unit 113.

The monitoring object determining unit 113 introduces stochastic operation to the selection of the relay to be monitored by reading the monitoring frequency $m_i$ of each relay from the monitoring frequency table managed by the monitoring frequency recording unit 111 and adding the selection probability information $\eta_i$ to the monitoring frequency $m_i$ (S60 to S64).

[Equation 14]

$$m_i^{prob} = m_i \eta_i \quad \text{(Equation 14)}$$

The updated monitoring frequency of each relay is normalized by Equation 15 to be a probability value (S65 to S67).

[Equation 15]

$$\tilde{m}_i^{prob} = \frac{m_i^{prob}}{\sum_k m_k^{prob}} \quad \text{(Equation 15)}$$

FIG. 16 illustrates an example of the data configuration for recording the normalized monitoring frequency calculated as described above.

The hop counts of the relays counted from the transmitter of the relay are recorded in the first column, the IP addresses allocated to the relays are recorded in the second column, and the normalized monitoring frequencies calculated by Equation 15 are recorded in the third column.

The monitoring object determining unit 113 considers the index of the relay to be selected as the stochastic variable by seeing the normalized monitoring frequency as the probability distribution for the index of the relay, and selects the relay to be monitored depending on the value of the stochastic variable (S68, S69).

The operations described above allow the early detection of the unexpected change in throughput, compared to the conventional method which monitors at fixed points. Furthermore, the measurement is performed on the relay selected according to the monitoring frequency distribution, and thus, compared to a conventional method in which all relays on the path were continuously monitored, it is possible to save the resource required for the measurement, allowing the use in a narrowband network.

Second Embodiment

Figure 17:
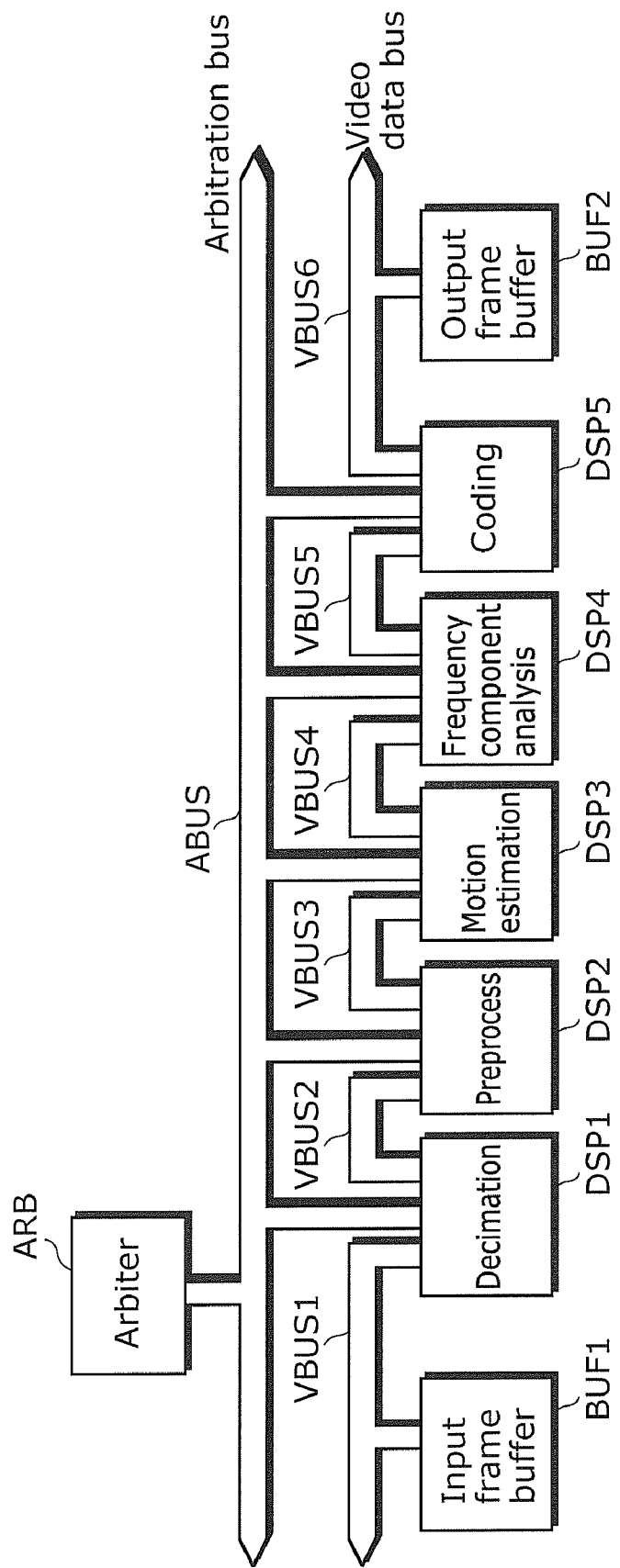
FIG. 17 is a block diagram illustrating the configuration of the video coding SoC according to the second embodiment.

FIG. 17 is a block diagram illustrating the configuration of the video coding SoC according to the second embodiment, as an example of the device to be controlled by the bus system monitoring device (arbiter) according to the second embodiment of the present invention.

Generally, a scheme for processing data in video coding standardized by MPEG2 and others are roughly divided into decimation for reducing the amount of information in input video signals, preprocess for reducing noise and limiting bandwidth, motion estimation, frequency spectrum analysis, video coding for compressing information and allocating codes using visual feature, and others.

The video coding SoC illustrated in FIG. 17 is an example of multi-core architecture performing these processes by independent digital signal processors DSP1, DSP2, DSP3, DSP4, and DSP5. The DSPs are connected by video data buses VBUS2, VBUS3, VBUS4, and VBUS5, respectively.

The video data to be coded is accumulated in the input frame buffer BUF1 for chroma signals. The video data first read by DSP1 through VBUS1, and decimated by DSP1. Subsequently, through VBUS2, VBUS3, VBUS4, VBUS5, preprocess by DSP2, motion estimation by DSP3, frequency component analysis by DSP4, coding by DSP5 are performed. Finally, the video data is transmitted to an output frame buffer BUF2 through VBUS 6.

An arbiter ARB monitors the amount of data generated in each DSP, and adjusts the amount of generated data in DSP1 when the transfer rate of the video bus exceeds a threshold.

Figure 18:
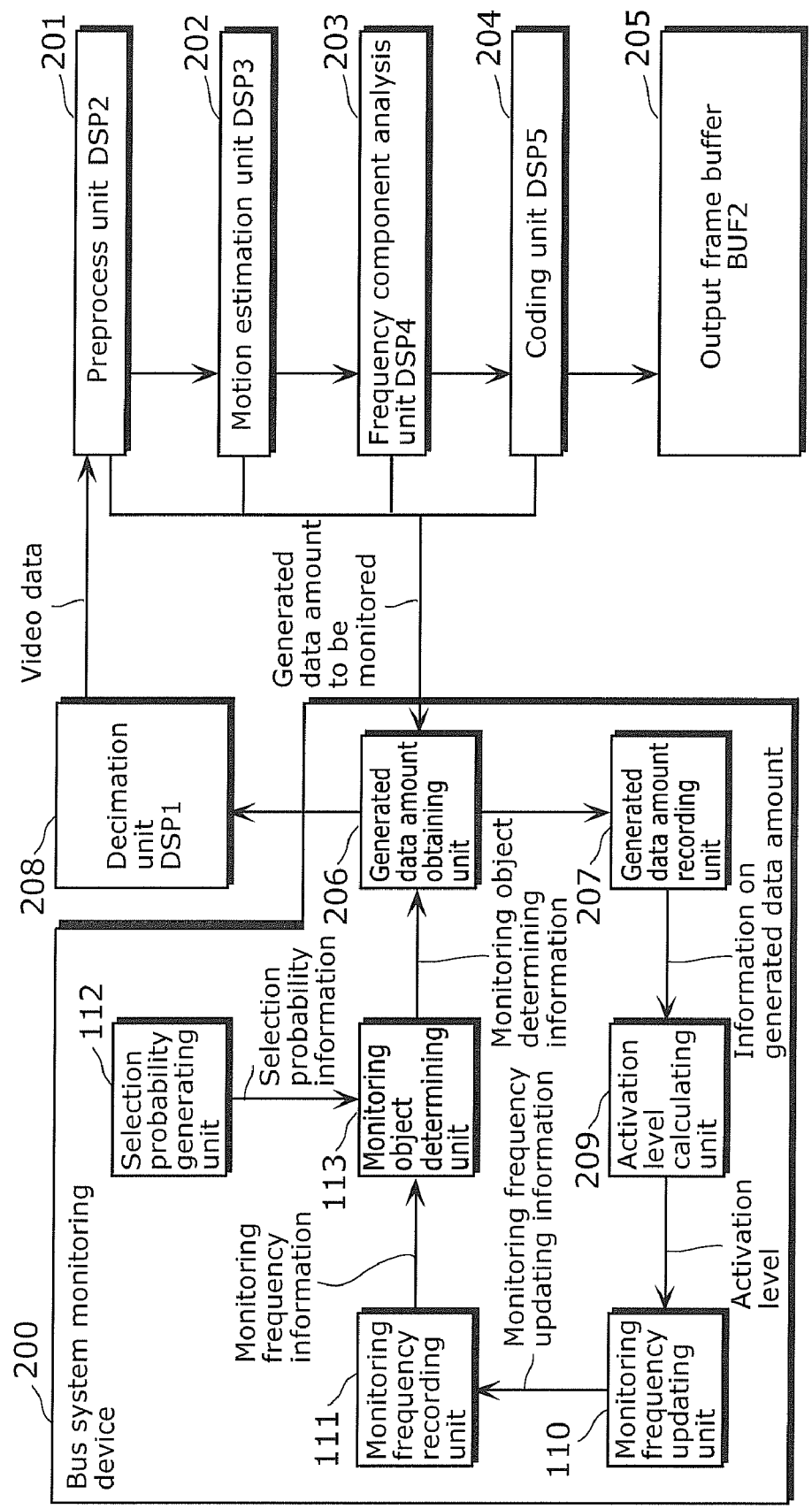
FIG. 18 is a functional block diagram illustrating an example of the configuration of the bus system monitoring device according to the second embodiment.

FIG. 18 is a functional block diagram illustrating the configuration of the main components of the arbiter ARB as the bus system monitoring device. FIG. 18 illustrates the main component of the arbiter ARB as the bus system monitoring device 200. Furthermore, the functional blocks implemented by DSP1 to DSP5 are illustrated as a decimation unit 208, a preprocess unit 201, a motion estimation unit 202, a frequency component analysis unit 203, and a coding unit 204. Furthermore, the output frame buffer BUF2 is illustrated as the output frame buffer 205.

In the bus system monitoring device 200 in FIG. 18, the same numerals are assigned to the components identical to those of the network monitoring device 100 (see FIG. 3), and the description for those elements are omitted. The following description explains only the differences in detail.

(Generated Data Amount Obtaining Unit 206)

The generated data amount obtaining unit 206 obtains the generated data amount information from the signal processors DSP2, DSP3, DSP4, and DSP5 on a video data transmission path selected by the monitoring object determining unit 113.

Figure 19:
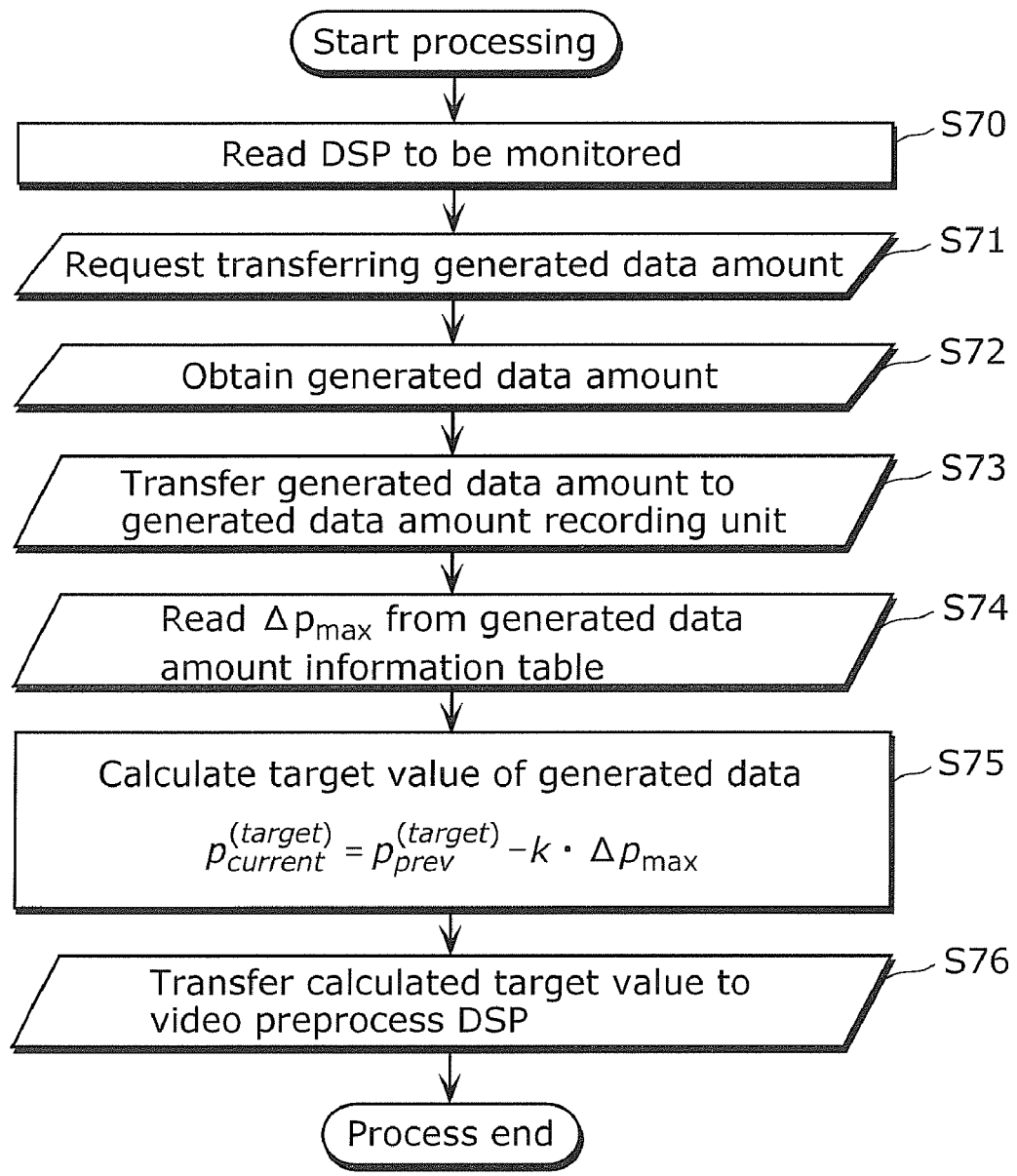
FIG. 19 is a flowchart illustrating an example of the generated data amount obtaining process in the second embodiment.

FIG. 19 is a flowchart illustrating an example of the process performed by the generated data amount obtaining unit 206.

The generated data amount obtaining unit 206 reads the information for determining DSP to be monitored (S70). The generated data amount obtaining unit 206 subsequently transmits a request for transferring the generated data amount to the DSP determined by the read information for determining DSP to be monitored (S71), and obtains the generated data amount information returned from the DSP (S72).

Figure 20:
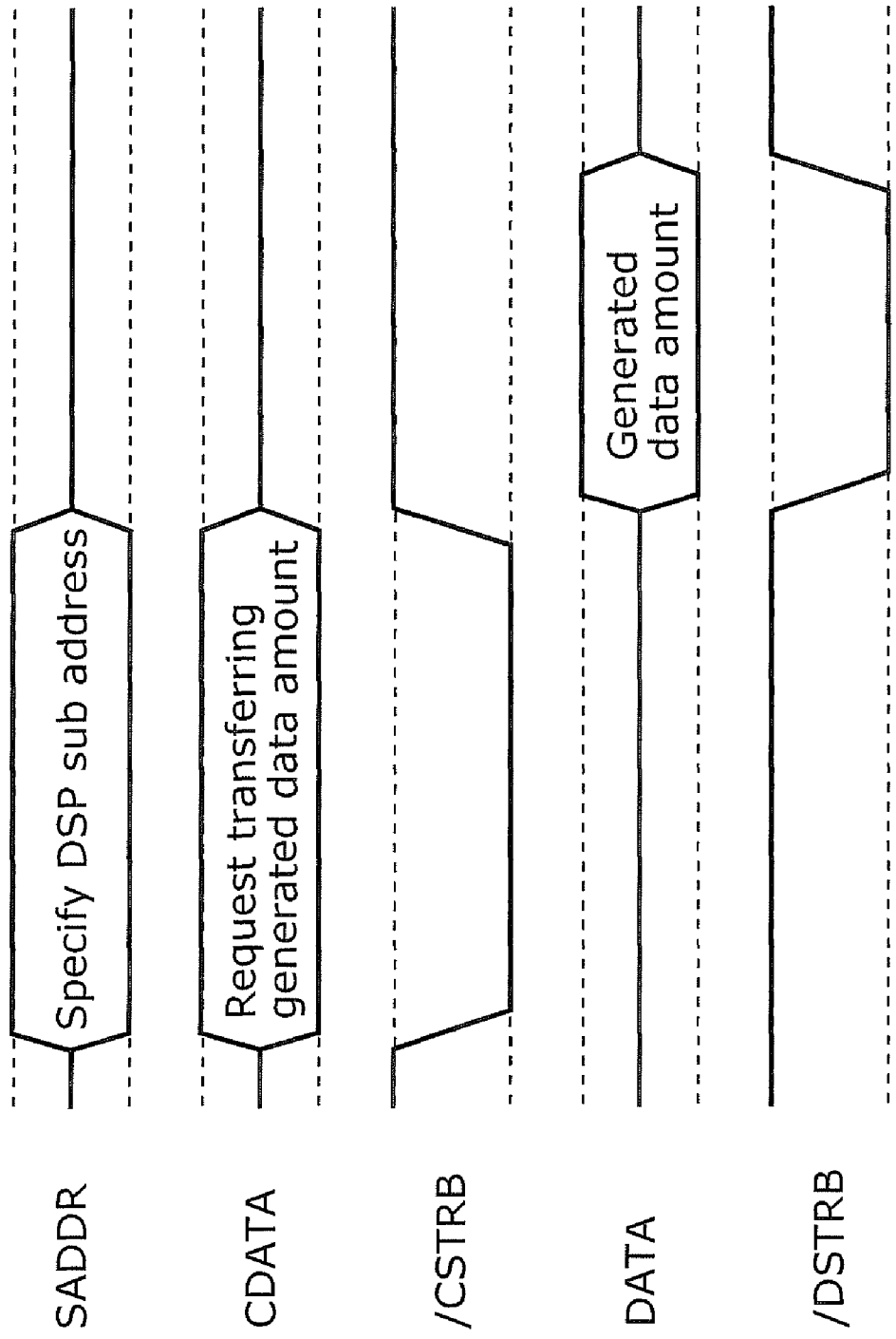
FIG. 20 is a timing chart for requesting or obtaining the generated data amount transfer according to the second embodiment.

FIG. 20 is a timing chart illustrating an example of signals transmitted from major signal lines configuring the arbitration bus ABUS when sending a request for transferring generated data amount and obtaining the generated data amount.

The bus system monitoring device 200 transmits a sub address of 8-bit width corresponding to the DSP to be monitored on SADDR, and serially transmits a command specifying bit pattern of 8-bit width defined as the request for the generated data amount on CDATA. The sub address is an 8-bit index allocated to each DSP, and for example, 0x01, 0x02, 0x03, 0x04, and 0x05 may be allocated to DSP1, DSP2, DSP3, DSP4, DSP5, respectively. Furthermore, the timing for validating the signal line is detected by DSP through asserting a command strobe (/CSTRB).

The DSP with the specified sub address generates generated data amount information of 8-bit width on a DATA line and drives a data strobe (/DSTRB) at a timing next to the timing when the negation on /CSTRB is detected, and transfers the generated data amount information to the bus system monitoring device 200.

When the bus system monitoring device 200 manages a maximum transfer speed of an output bus allocated to each DSP, the generated data amount is defined in a range from 0x00 to 0x64, and a ratio of an actual transfer speed to a maximum transfer speed of the output bus currently allocated may be transferred on DATA line.

The generated data amount information obtained by the generated data amount obtaining unit 206 is transferred to the generated data amount recording unit 207, recorded on a generated data amount information table and managed (S73). Details for the process performed by the generated data amount recording unit 207 shall be described later.

The generated data amount obtaining unit 206 reads the generated data amount difference value to the DSP with the maximum difference of generated data amount, and calculates a target value of the generated data amount according to Equation 16 (S74 to S75).

[Equation 16]

$$p_{current}^{(target)} = p_{prev}^{(target)} - k \cdot \Delta p_{max} \quad \text{(Equation 16)}$$

Figure 21:
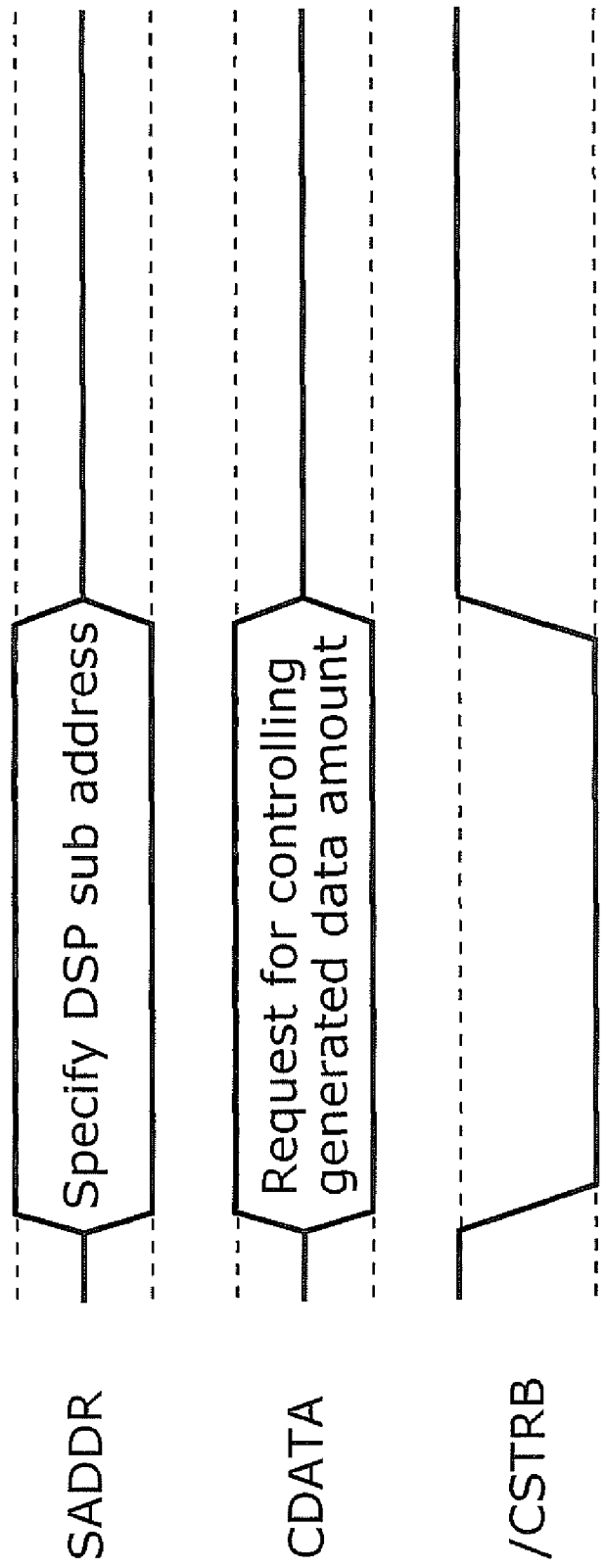
FIG. 21 is a timing chart of a request for controlling the generated data amount according to the second embodiment.

The calculated target value is transferred to the decimation unit 208 according to the timing chart in FIG. 21. Here, 0x01 which is allocated to the decimation unit 208 is specified as the sub address of DSP (S76).

(Generated Data Amount Recording Unit 207)

Figure 22:
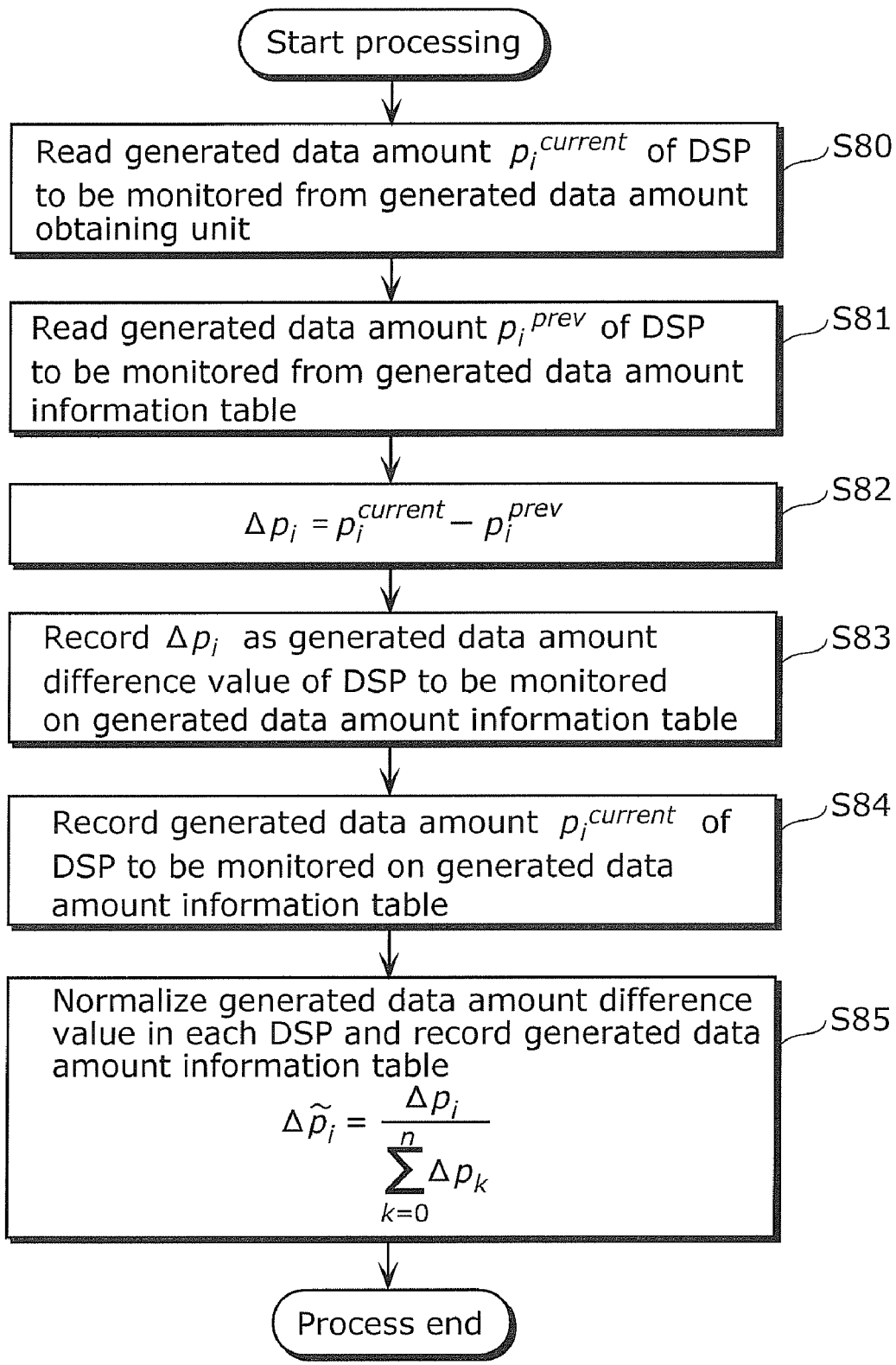
FIG. 22 is a flowchart illustrating an example of the generated data amount recording process according to the second embodiment.

FIG. 22 is a flowchart illustrating an example of the process performed by the generated data amount recording unit 207.

The generated data amount recording unit 207 reads the generated data amount information of the DSP to be monitored collected by the generated data amount obtaining unit 206 (S80).

FIG. 23 illustrates an example of the data configuration of the generated data amount information table.

Sub addresses of DSP are recorded in the first column of the generated data amount information table in advance. Maximum transfer speeds each allocated to an output bus of each of DSPs are recorded in the second column in advance, and the DSPs adjust output bus clock based on this information. The generated data amount $p_{current}$ obtained by the generated data amount obtaining unit 206 is recorded in the third column. The generated data amount $p_{prev}$ recorded last time is read before writing data (S81), and a difference value is calculated according to Equation 17, and the difference of generated data amount value is recorded in the fourth column (S82 to S83).

[Equation 17]

$$\Delta p_i = p_i^{current} - p_i^{prev} \qquad \text{(Equation 17)}$$

Afterwards, the value of $p_{current}$ is recorded in the third column (S84). In the fifth column, the value after normalizing the data in the fourth column is recorded (S85).

[Equation 18]

$$\Delta \tilde{p}_i = \frac{\Delta p_i}{\sum_{k=0}^{n} \Delta p_k} \qquad \text{(Equation 18)}$$

(Decimation Unit 208)

The decimation unit 208 adjusts the data amount to be transferred to VBUS 2 based on the generated data amount information table. The generated data amount may be controlled by adjusting the output resolution of the decimation filter to the video signal read from the input frame buffer.

The effective value as output resolution is discrete. Thus, it is preferable to perform decimation at a maximum output resolution that does not exceed a target value specified by the generated data amount obtaining unit 206.

(Activation Level Calculating Unit 209)

Figure 24:
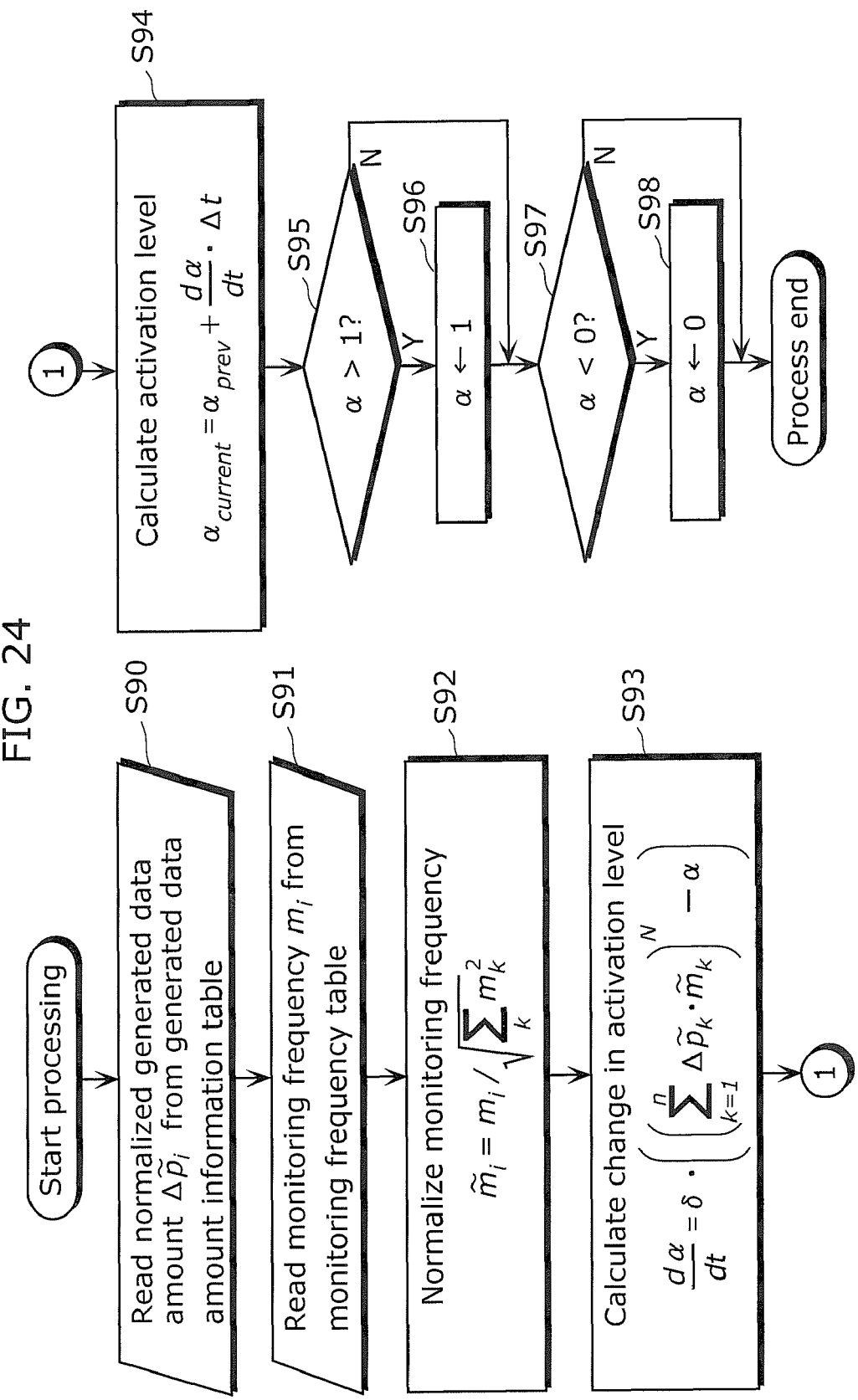
FIG. 24 is a flowchart illustrating an example of the activation level calculating process according to the second embodiment.

FIG. 24 is a flowchart illustrating an example of the process performed by the activation level calculating unit 209. As shown in FIG. 24, the process performed by the activation level calculating unit 209 (S90 to S98) differs from the process by the activation level calculating unit 109 (See S40 to S49 in FIG. 12) in that a normalized value of the generated data amount $p_i$ is used instead of the normalized value of the link RTT $l_i$.

Due to the difference, the activation level calculating unit 209 defines the dynamics of the activation level as shown in Equation 19, for example, using correlation between the normalized monitoring frequency for each DSP and the difference of normalized generated data amount.

[Equation 19]

$$\frac{d\alpha}{dt} = \delta \cdot \left( \left( \sum_{k=1}^{n} \Delta \tilde{p}_k \cdot \tilde{m}_k \right)^N - \alpha \right) \qquad \text{(Equation 19)}$$

As described above, with the communication device, communication method, and program described in the first and second embodiments allow understanding the status of the transmission path robust for unpredictable change in the throughput and limiting the load on the network caused by the measuring packet required for monitoring the relay to minimum, by stochastically selecting the relay to be monitored in the network application such as media transfer in which the change in throughput could lead to the decreased service quality.

Note that, the relay selection device, method, program according to the present invention has a feature that determines a relay to be monitored for understanding the status of transmission path in a data transmission service on an IP network that performs data transfer using multiple-layered relay, by adding both the load status of the relay and stochastic randomness. With this, the device is more robust to the unpredictable change in the network status, and can suppress the load on measurement for measuring the network status, and thus effective in a case when applied to a bandwidth-sharing communication system susceptible to the change in throughput in the transmission path due to unpredictable effect by other service traffic.

Furthermore, the measuring load for monitoring the network status can be limited. Thus, when it is applied to a system configured with mobile devices whose cost for using the line is expensive, it is effective for reducing the measuring packets and consumption power.

It is particularly effective for media transmission services, monitoring camera systems, TV conference systems, video streaming systems, and IP telephone systems which are sensitive to QoS change in the transmission path. Furthermore, it is applicable, not only to a network system, but also to an arbiter controlling logic for a LSI with a bandwidth sharing bus architecture.

Third Embodiment

Power consumption of semiconductors has been reduced by increasing the integration through miniaturization of the process rule. However, in the miniaturized process rule that has been recently used, it is difficult to perform scaling which balances between further integration and reduction in consumption power due to the increase in the leak current in a transistor circuit.

In response to this problem, reduction in consumption power by embedding multiple cores in a processor has attracted attention. Network-on-Chip (NoC) is an inter-core connection bus which effectively connects multiplied cores and secures flexible communication.

Figure 25:
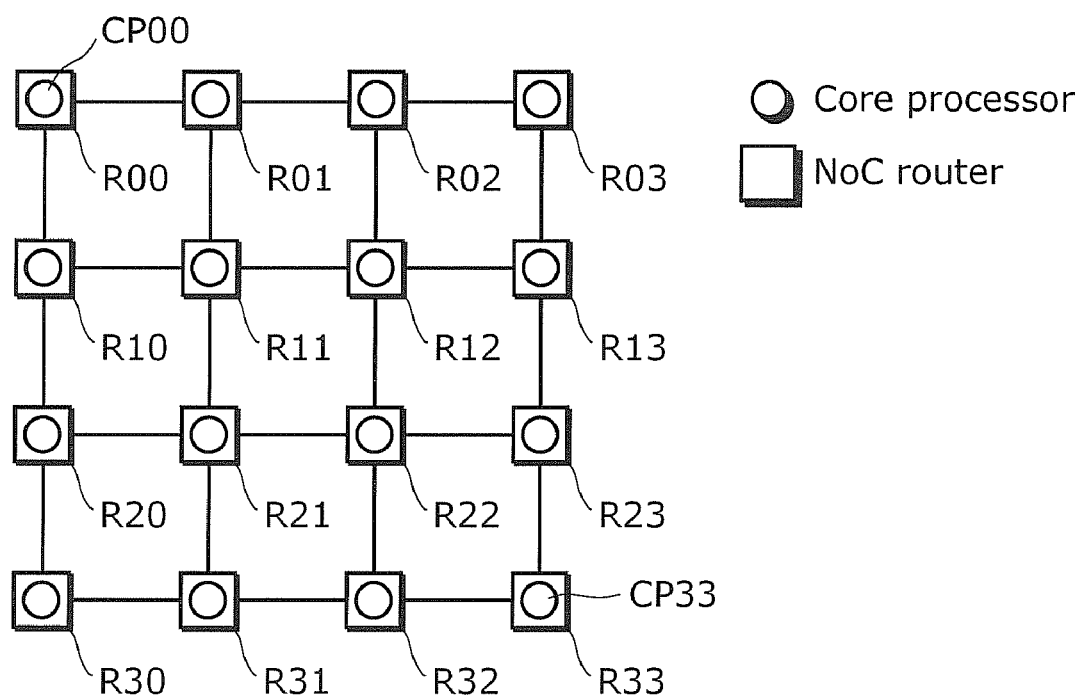
FIG. 25 is a block diagram illustrating the configuration of the multi-core processor according to the third embodiment.

FIG. 25 is a block diagram illustrating an example of a mesh multi-core processor connected by NoCs. Each core processor is connected to a NoC router, and NoC routers are connected by simple buses.

The NoC router is a functional block which transfers data such as the router in an IP network. When sending data from the core processor CP00 to CP33, the NoC router controls the path such that the data pass through R00 connected to the output port of CP00, via R01, R02, R03, R13, R23, and R33, and reaches the core processor CP33.

The data flows between cores per packet, and flows on a bus per flit. Usually, a packet is composed of flits including packet headers. In the same manner as the IP packet in the network system, addresses of the core processor of the transmission source and the address of the core processors of the transmission destination are stored the packet header. The NoC router transmits the packet to a suitable output port by controlling a crossbar switch on an output stage based on the information of the packet header and the routing information.

Unlike the best effort system on the IP network configured of mesh topology, the loss of flit due to the congestion on the router does not occur on the NoC bus on the processor, and the data stays on the NoC router until the congestion is solved.

Thus, when the congestion occurs on a NoC router on a path used for transferring flits between core processors, the time that the flit stays on the path becomes longer, which consequently increases the latency of data transfer between the core processors and causes ineffective communication status.

When the data transferred between the core processors is data that requires real-time processing such as the coded video signal, there is a case where the data necessary for core processors which is a transfer destination does not arrive within a preferable time due to the flits staying on the path. In such a circumstance, the video is left unprocessed, and the processing by the processor fails for a predetermined time.

The cause of the NoC router congestion is unexpected traffic between core-processors, and includes estimation error when designing chip or variation in the generated code amount dependent on the original signal to be coded.

In order to solve the above problem, in the third embodiment, a multi-core processor robust to the unexpected change in traffic between the other core processors by transmitting data using multiple path from a core processor which is on the transmission side to a core processor which is on a reception side.

Figure 26:
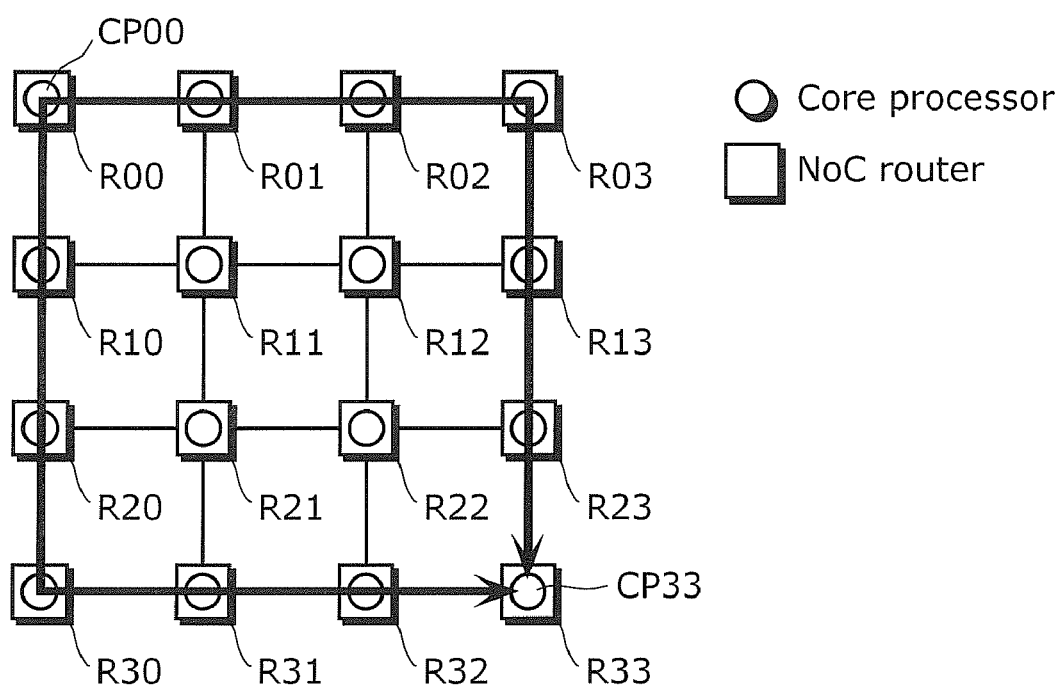
FIG. 26 illustrates a transmission status of the traffic according to the third embodiment.

FIG. 26 illustrates a case where, when transferring data from the core processor CP00 on the transmission side to the core processor CP33 on the reception side, the traffic is transmitted using two paths. Although two paths are listed as the multiple paths in this example, more paths may be used.

With this application, the core processor CP00 on the transmission side can switch the transmission path to a substitute path passing through R30 when the data is transferred to CP33 using a path passing through R03 as a main path, with the deterioration of the transmission status caused by the congestion on the main path. Furthermore, distributing the load, that is, part of the data amount being transmitted using the main path, to a substitute path passing through R30 secures real-time data transfer within a desired time while easing the congestion on the main path.

Figure 27:
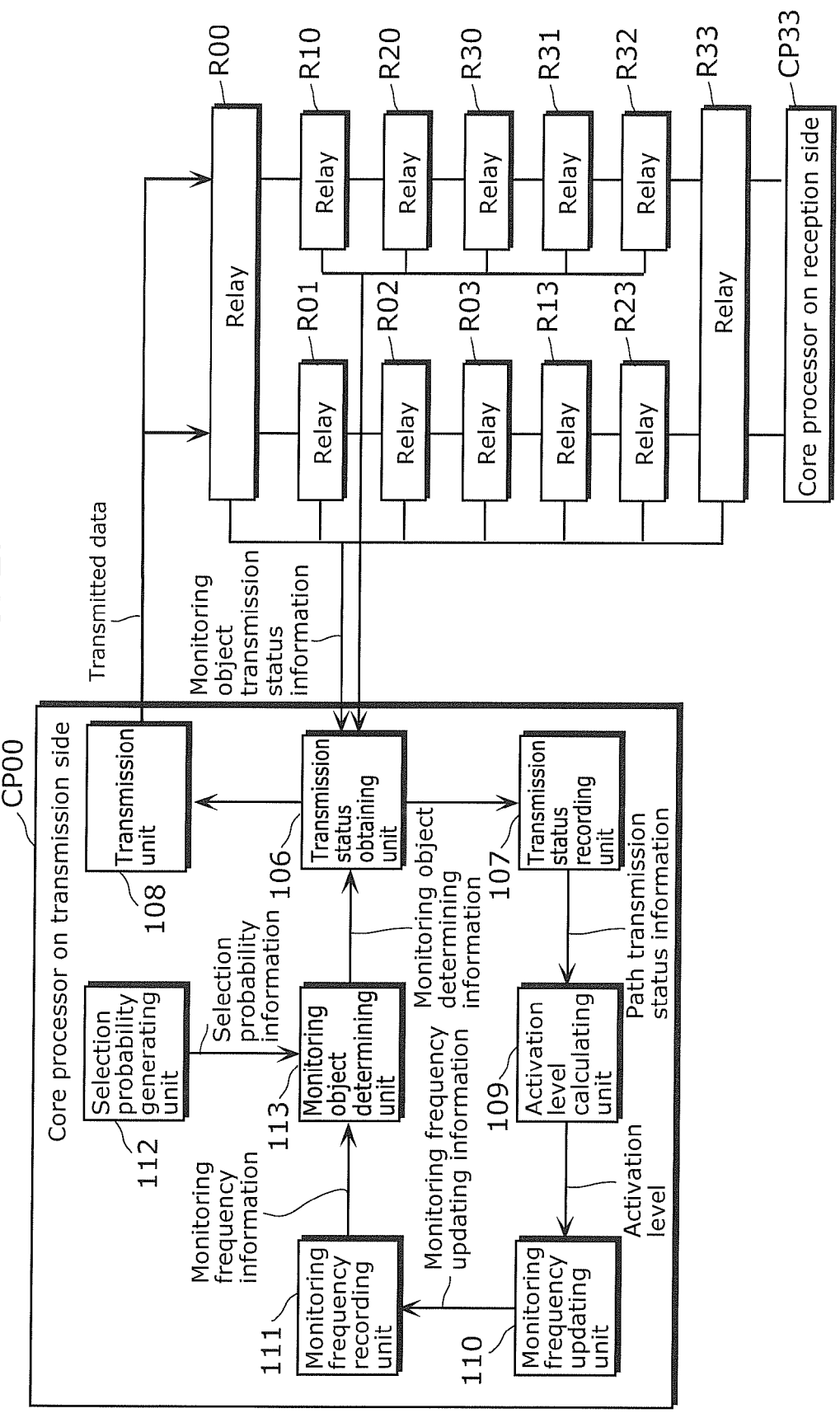
FIG. 27 is a block diagram illustrating the configuration of the core processor according to the third embodiment.

FIG. 27 illustrates the configuration of the core processor on the transmission side. The relay on FIG. 27 corresponds to the NoC router in NoC. In the core processor CP00 on the transmission side in FIG. 27, the same reference numerals are assigned to the components identical to those of the network monitoring device 100 (see FIG. 3), and the description for those components are omitted. The following describes only the differences in detail.

(Transmission Status Obtaining Unit 106)

The transmission status obtaining unit 106 obtains the monitoring object transmission status information from the NoC router to be monitored determined by the monitoring object determining unit 113. The average stay time R of flit in the NoC router may be considered as an example of the monitoring object transmission status information. Thus, in this embodiment, the description is made using the average stay time. Indexes other than the average stay time may be used as long as the index reflects the status of load on the NoC router.

Figure 28:
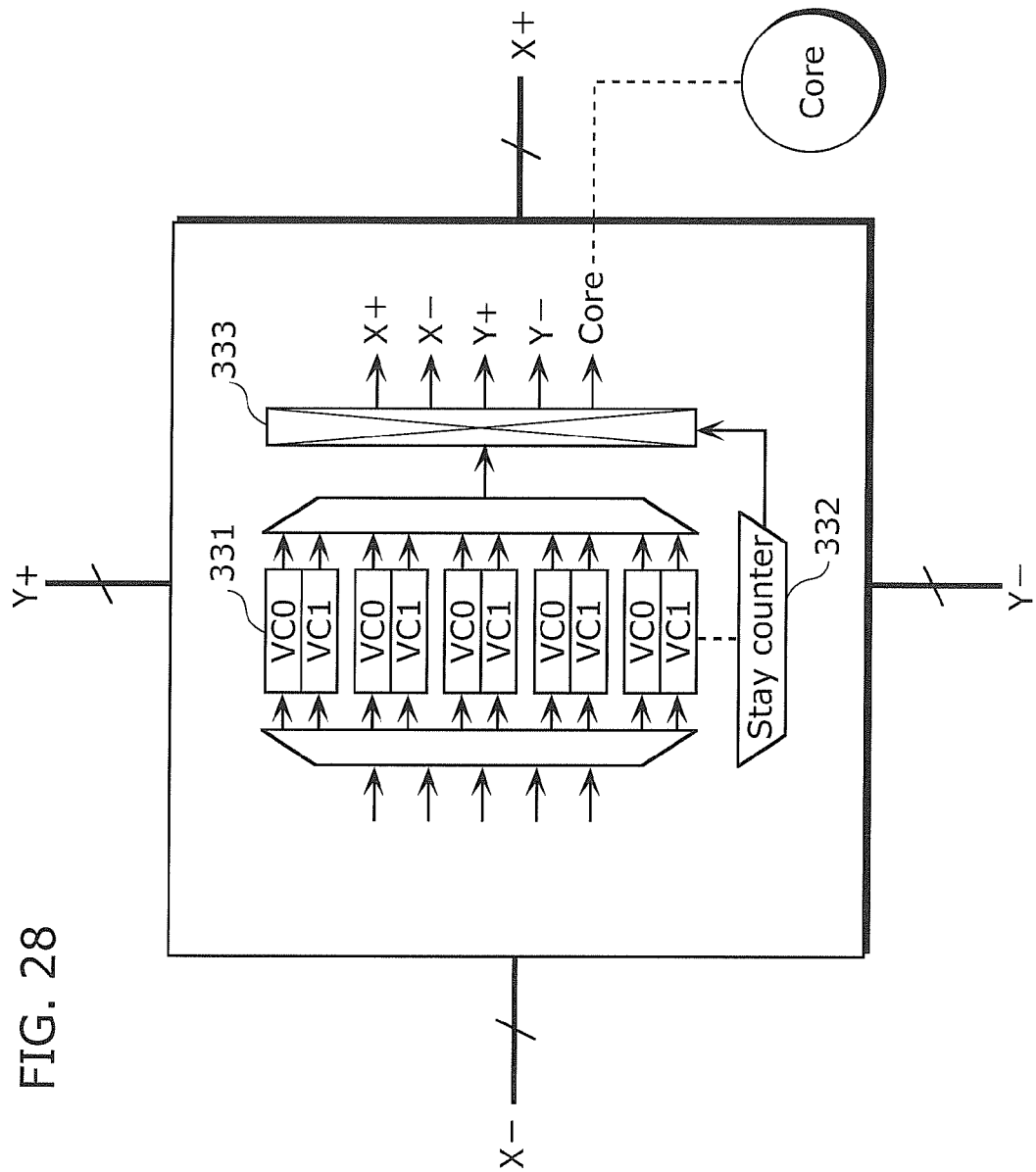
FIG. 28 is a block diagram illustrating the internal configuration of the NoC router according to the third embodiment.

FIG. 28 illustrates an internal configuration of the NoC router. The NoC router connected by a two-dimensional mesh topology that has five input ports and five output ports in total, in four directions, that is, up, down, left, right, and a direction of core processor directly connected to the NoC router.

In FIG. 28, the input and output ports in four directions, that is, up, down, left, right are denoted as X+, X−, Y+, and Y−, respectively, and the input and output port in the direction of core processor is denoted as Core. Among the five ports, the flit input from any port is temporarily stored in the corresponding input buffer 331, and output to an appropriate port after the port to output the flit is determined and the crossbar switch 333 on the output stage is switched.

If the input buffer of the NoC router in the next stage of the port to be output is full, the flit stays in the input buffer, and is output after the transition to the status in which output is possible. The staying counter 332 measures average stay time of flit on the input buffer, and notifies the core processor which is the transmission source of the traffic.

Generally, the input buffer is composed of one or multiple virtual channels, and prevents the flits to be transmitted with different ports to be output stays due to the spillover effect of another flit input from the same port before the flit. In FIG. 28, the input buffer is composed of two virtual channels VC0 and VC1.

FIG. 29 illustrates a format example of the notification request packet issued by the core processor which is the transmission source of the traffic to the NoC router from which the average stay time is obtained.

FIG. 30 illustrates an example of format of the notification packet for notifying, by the NoC router which received the notification request packet, of the core processor which is the transmission source of the average stay time.

The transmission status obtaining unit 106 collects the average stay time for all of the available paths by exchanging the packets, and detects the status of congestion on each transmission path.

(Transmission Unit 108)

The transmission status obtaining unit 106 collects average stay time of flits on each NoC router on the transmission paths. In FIG. 27, R1 denotes the maximum value of the average stay time of the NoC routers on the path from the core processor CP00 through the NoC routers R00, R01, R02, R03, R13, R23, R33, to CP33. Similarly, R2 denotes the maximum value of the average stay time of the NoC routers on the path from the core processor CP00 through the NoC routers R00, R10, R20, R30, R31, R32, R33, to CP33. Here, R1 and R2 are represented as shown in Equation 20 and 21.

[Equation 20]

$$R_1 = \max\{R_{01}, R_{02}, R_{03}, R_{13}, R_{23}\} \qquad \text{(Equation 20)}$$

[Equation 21]

$$R_2 = \max\{R_{10}, R_{20}, R_{30}, R_{31}, R_{32}\} \qquad \text{(Equation 21)}$$

Furthermore, P0 and P1 are obtained by normalizing R0 and R1 according to Equation 22.

[Equation 22]

$$P_i = \frac{R_i}{\sum_{k=1}^{m} R_k} \qquad \text{(Equation 22)}$$

The transmission unit 108 considers P0 and P1 in Equation 22 as path selecting probabilities for transmitting the data packets to the core processor CP33 on the reception side, and selects a transmission path for each packet.

(Selection Probability Generating Unit 112)

Implementation of function for generating pseudorandom numbers according to uniform distribution or Gaussian distribution is difficult in semiconductor with strict limit on the number of gates or an embedded processor for network with small memory resource.

As the simple implementation of the selection probability generating unit 112, a digit sequence with no overlap may be stored as a list, and cyclically used. For example, cyclically reading a number from the list in which 1, 2, 3, 4, 5, 6, and 7 are stored, and substituting the read result for the generation result of pseudorandom numbers allows reducing the resource for calculating random numbers. The selection probability generating unit 112 outputs the numbers read from the list to the monitoring object determining unit 113.

(Monitoring Object Determining Unit 113)

The monitoring object determining unit 113 determines the NoC router associated with the number input from the selection probability generating unit 112 in a situation where the stochastic operation that the activation level calculating unit 109 outputs an activation level lower than the predetermined threshold is dominant, when determining the NoC router to be monitored. That is, the NoC router to be monitored is uniformly selected according to the order in the number list stored by the selection probability generating unit.

For example, when R00 is the first NoC router, R01 is the second NoC router, R02 is the third NoC router, R03 is the fourth NoC router, R13 is the fifth NoC router, R23 is the sixth NoC router, and R33 is the seventh NoC router and 1, 2, 3, 4, 5, 6, and 7 are included in the list, the NoC routers R00, R01, R02, R03, R13, R23, and R33 are cyclically selected and monitored in this order.

Changing the series of pseudorandom numbers in uniform distribution to a round-robin ordered sequence based on the order list allows implementation of the configuration of the present invention with low resource. Such an embodiment is included in the present invention, since uniform distribution effect of the monitoring object is expected.

With the structure described above, stochastically selecting the NoC router to be monitored allows implementation of high-quality NoC chip with small monitoring overhead and robust to the unexpected change of the transfer traffic between the cores on the multi-core processor. Furthermore, removing the monitoring overhead and increasing traceability of the transmission status to high-speed traffic change allows configuring power-saving system.

Fourth Embodiment

Figure 31:
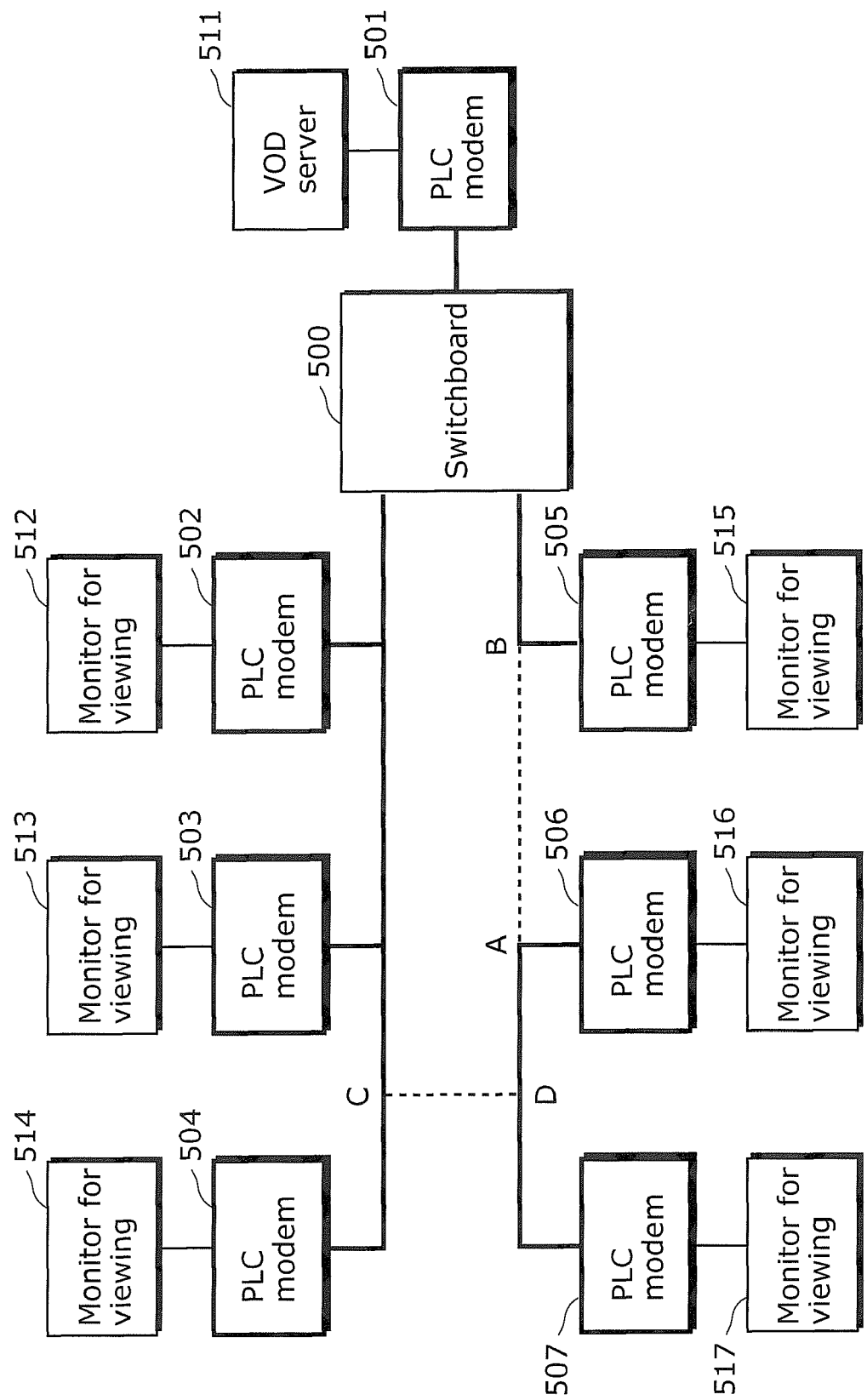
FIG. 31 is a block diagram illustrating the configuration of the VOD system according to the fourth embodiment.

FIG. 31 illustrates a Video-on-Demand (VOD) system for professional use using power line.

Infrastructure using the Power Line Communication (PLC) is suitable for introducing a network system in existing hotels, for example because it is not necessary to lay new communication lines. However, it is known that in the communication environment, the attenuation of the signal level changes locally or temporally by the noise generated by the load device such as other electric appliance and reflection of the communication wave, since the power line which is not expected to be used for communication is used as a communication path.

For this reason, at the time of a relatively long distance end-to-end communication which crosses rooms, the signal level is secured by a multi-hop transfer through PLC modems and relay devices on the path.

In the system illustrated in FIG. 31, the video content is distributed to the monitors for viewing 512 to 517 from the VOD server 511. For example, when sending video content from the VOD server 511 to the monitor for viewing 517, the video content reaches the monitor for viewing 517 through a PLC modem 501, a switchboard 500, the PLC modems 505 to 507, using the existing power line as a path.

In addition, when the link between A and B deteriorates due to external factors, there are cases where higher quality data transmission is available using the path to the monitor for viewing 517 from the VOD server 511, through the PLC modem 501, the switchboard 500, the PLC modem 502, the PLC modem 503, the section between C and D, and the PLC modem 507.

Although there is no wired connection on the section between C and D on the path is not connected, when the distance between the power lines provided in parallel is small, an available wireless path is formed between C and D by the interference on the signal status between the communication paths. The power line of hotels and buildings usually takes a tree-structured topology which spreads from the center switchboard. However, depending on a behavior of lines in distributed element model generates a wireless section, actually taking a mesh-topology.

According to this embodiment, in a VOD system which transmits video content requiring QoS, using multi-hop transmission through mesh power line infrastructure, high quality VOD transmission limiting the overhead of the measuring packet necessary for monitoring transmission quality and robust to the unexpected change in the through is possible by stochastically selecting the PLC modem to be monitored according to the present invention.

Figure 32:
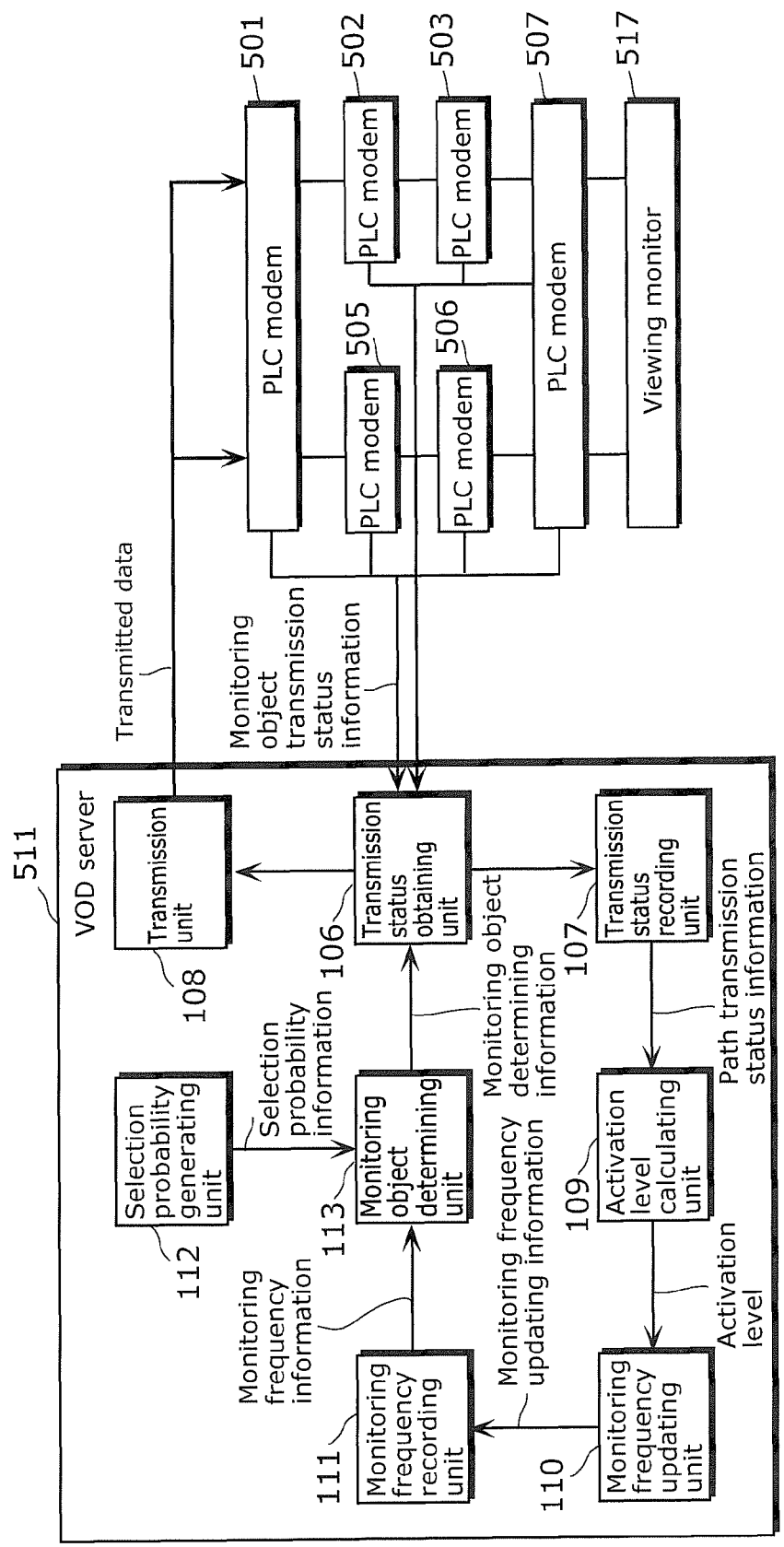
FIG. 32 is a block diagram illustrating the configuration of the VOD server according to the fourth embodiment.

FIG. 32 is a block diagram illustrating the structure of the VOD server 511. The noise multiplexed on the power line has high correlation with the status of use of the electric appliances connected to the communication path, and transmission quality control using the history of the communication status is effective since it usually depends on the time, place of the use of the electric appliances, and life pattern of the user.

The following description describes only the difference from the first embodiment in detail.

(Monitoring Frequency Recording Unit 111)

Figure 33:
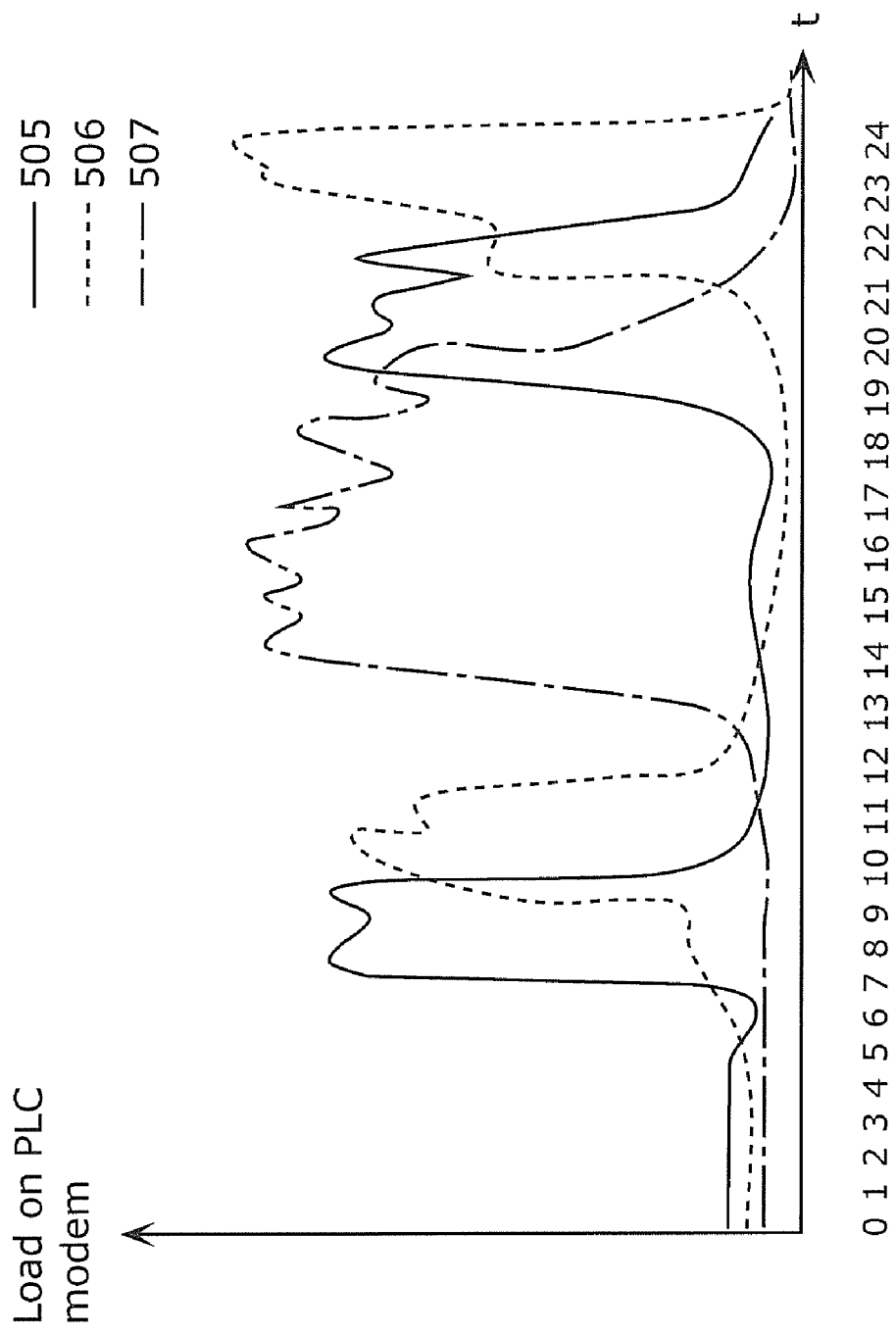
FIG. 33 is a diagram illustrating the change in the transmission status of the PLC modem according to the fourth embodiment.
Figure 35:
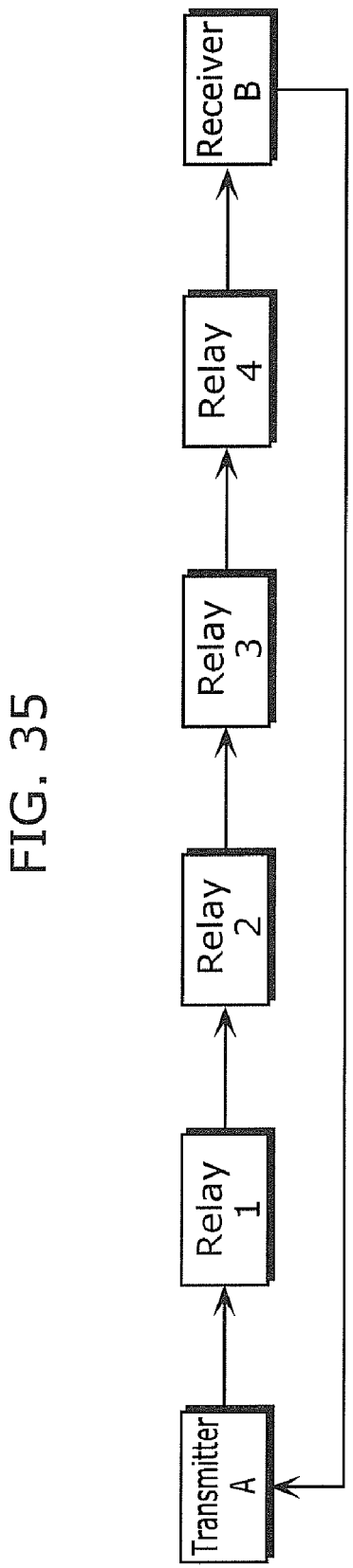
FIG. 35 is a configuration diagram illustrating an example of a conventional network that distributes video data by streaming.
Figure 36:
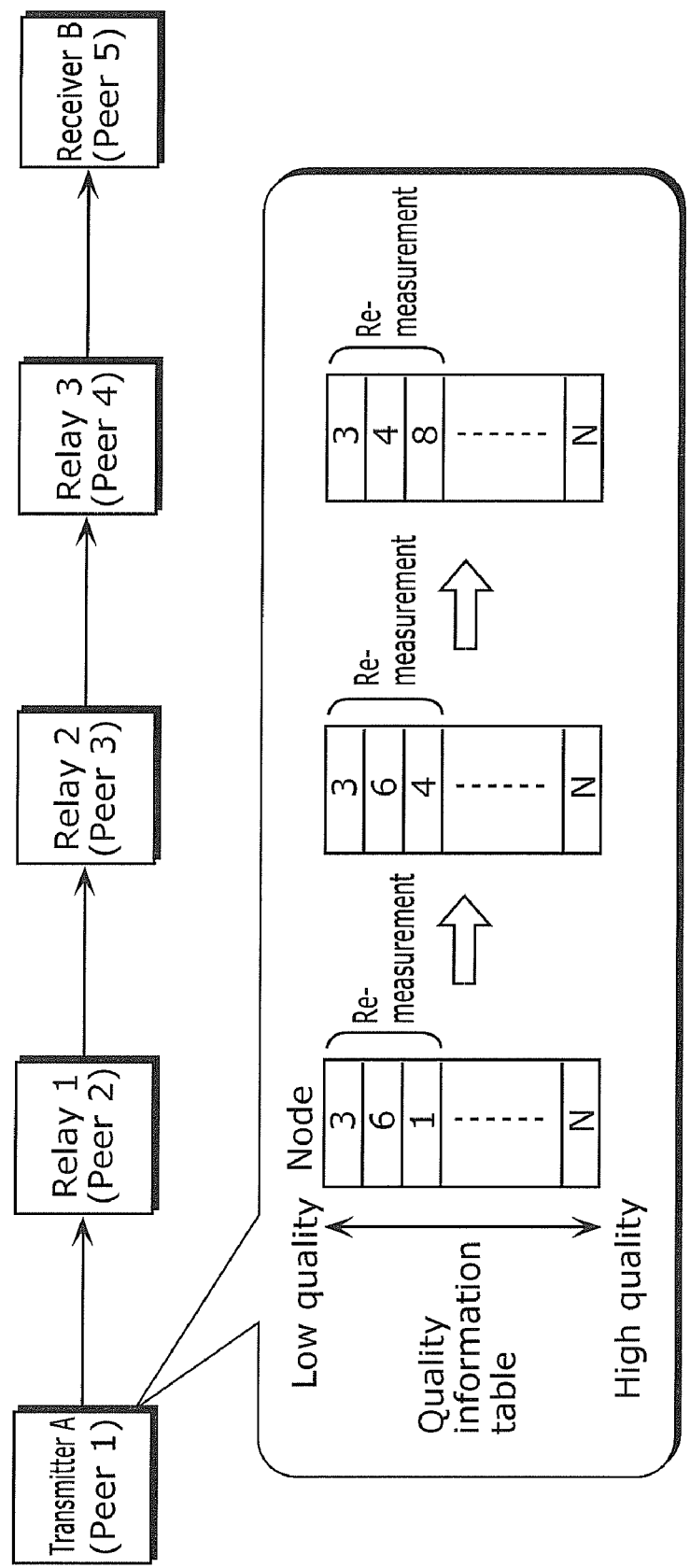
FIG. 36 is a configuration diagram illustrating an example of the P2P network in which the conventional data transmission application operates.

FIG. 33 illustrates the change in the transmission status of the PLC modems 505 to 507 on the path from the VOD server 511 to the monitor for viewing 517 for 24 hours.

On the three hours between 19:00 to 22:00, the load on the PLC modems 505 and 507 increases. In 20:00 hour, the load on the PLC modem 505 is still relatively high, while the load on the PLC modem 507 is decreased. In addition, in 21:00 hour, the load on the PLC modem 506 increases, in addition to the PLC modem 505.

The cyclical temporal change of load and the distribution of the number of monitoring caused by that reflects the influence of the use of the electric appliance, and thus reproducible.

FIG. 34 illustrates an example of data configuration for recording the monitoring frequency. In addition to the data configuration illustrated in the first embodiment (for example, see FIG. 14), the field for recording the history of the number of monitoring per unit time for each PLC modem is included.

As illustrated by the load status around 19:00 hour and 21:00 hour in FIG. 33, when it is necessary to monitor multiple monitoring objects at high frequency, the monitoring frequency $m_i$ for a particular set of PLC modems may be set, in addition to the monitoring frequency for each PLC modem. In the same manner as the other $m_i$, the newly introduced $m_j$ may be controlled according to Equation 8.

(Monitoring Frequency Updating Unit 110)

The monitoring frequency updating unit 110 updates and normalizes the value of the monitoring frequency $m_i$ for a set of PLC modems in the same manner as the monitoring frequency $m_i$ of each PLC modem.

(Transmission Status Obtaining Unit 106)

The transmission status obtaining unit 106 obtains the transmission status in the same manner as the methods illustrated in FIGS. 6 and 7 for the corresponding PLC modems when obtaining the transmission status for the set of corresponding PLC modems.

With the abovementioned operations, it is possible to provide a high-quality and low-consumption power VOD service system robust to the unexpected change in the throughput capable of highly precisely monitoring transmission status with less monitoring overhead.

INDUSTRIAL APPLICABILITY

The present invention is applicable to a network which transmits data through relays, and a bus system in which signal processing units are connected, and which transfers data to be processed in the signal processing units.

[Reference Signs List]

| | |
|---|---|
| 100 | Network monitoring device |
| 101 to 104 | Relay |
| 105 | Receiver |
| 106 | Transmission status obtaining unit |
| 107 | Transmission status recording unit |
| 108 | Transmission unit |
| 109 | Activation level calculating unit |
| 110 | Monitoring frequency updating unit |
| 111 | Monitoring frequency recording unit |
| 112 | Selection probability generating unit |
| 113 | Monitoring object determining unit |
| 200 | Bus system monitoring device |
| 206 | Generated data amount obtaining unit |
| 207 | Generated data amount recording unit |
| 208 | Decimation unit |
| 209 | Activation level calculating unit |
| 331 | Input buffer |
| 332 | Staying counter |
| 333 | Cross bar switch |
| 500 | Switchboard |
| 501 to 507 | PLC modem |
| 511 | VOD server |
| 512 to 517 | Monitor for viewing |

The invention claimed is:

1. A network monitoring device which monitors a network in which data is transmitted through a plurality of relays, said network monitoring device comprising:

a monitoring frequency recording unit configured to record monitoring frequencies each of which represents a monitoring frequency for monitoring a transmission status of a corresponding one of the plurality of relays;

a selection probability generating unit configured to generate selection probability information which is probability values for the plurality of relays;

a monitoring object determining unit configured to determine, according to the monitoring frequency and the selection probability information, a relay the transmission status of which is to be monitored, from the plurality of relays;

a transmission status obtaining unit configured to obtain transmission status information indicating a transmission status on the relay determined by said monitoring object determining unit;

a transmission status recording unit configured to record the transmission status information;

an activation level calculating unit configured to calculate, based on a difference in activation level, which increases in accordance with a correlation between the transmission statuses and the monitoring frequencies of the plurality of relays indicated by the transmission status information, the activation level indicating suitability of the monitoring on the transmission statuses of the plurality of relays; and a monitoring frequency updating unit configured to update, based on a difference in monitoring frequency which increases in accordance with the activation level, the monitoring frequency recorded on said monitoring frequency recording unit.

2. The network monitoring device according to claim 1, wherein said transmission status recording unit is configured to record a round trip time of a relay i as the transmission status information, said activation level calculating unit is configured to calculate a correlation value $\alpha$ representing extent of tendency that the relay with a larger round trip delay time has a higher monitoring frequency $m_i$, said monitoring frequency updating unit is configured to update the monitoring frequency $m_i$ such that the smaller the correlation value $\alpha$ is, the smaller a difference between a maximum value and other values among monitoring frequencies $m_i$; of the plurality of relays becomes, said selection probability generating unit is configured to generate, for each relay, a probability value $\eta_i$ which is a random value within a range determined according to a convergence value of the difference, and said monitoring object determining unit is configured to determine the relay, the transmission status of which is to be monitored, based on a stochastic behavior, according to a probability distribution represented by monitoring frequencies of the plurality of relays, each of which is given by adding the monitoring frequency $m_i$ and the probability value $\eta_i$.

3. A bus system monitoring device to which a plurality of signal processors are connected and which transmits data processed by the plurality of signal processors, said bus system monitoring device comprising:

a monitoring frequency recording unit configured to record monitoring frequencies each of which represents a monitoring frequency for a data generation status of a corresponding one of the plurality of signal processors;

a selection probability generating unit configured to generate selection probability information which is probability values for the plurality of signal processors;

a monitoring object determining unit configured to determine, according to the monitoring frequency and the selection probability information, a signal processor the data generation status of which is to be monitored;

a generated data amount obtaining unit configured to obtain generated data amount information indicating a data generation status on the signal processor determined by said monitoring object determining unit;

a generated data amount recording unit configured to record the generated data amount information;

an activation level calculating unit configured to calculate, based on a difference in activation level, which increases in accordance with a correlation between data amount generated in each signal processor and the monitoring frequencies of the plurality of signal processors, indicated by the generated data amount information, the activation level indicating suitability of the monitoring on the data generation statuses of the plurality of signal processors; and a monitoring frequency updating unit configured to update, based on a difference in monitoring frequency which increases in accordance with the activation level, a monitoring frequency recorded on said monitoring frequency recording unit.

4. The bus system monitoring device according to claim 3, wherein said transmission status recording unit is configured to record generated data amount $p_i$ of a signal processor i as the transmission status information, said activation level calculating unit is configured to calculate a correlation value $\alpha$ representing extent of tendency that the signal processor with larger generated data amount $p_i$ has a higher monitoring frequency $m_i$, said monitoring frequency updating unit is configured to update the monitoring frequency $m_i$ such that the smaller the correlation value $\alpha$ is, the smaller a difference between a maximum value and other values among monitoring frequencies $m_i$ of the plurality of signal processors becomes, said selection probability generating unit is configured to generate, for each signal processor, a probability value $\eta_i$ which is a random value within a range determined according to a convergence value of the difference, and said monitoring object determining unit is configured to determine the signal processor, the transmission status of which is to be monitored, through a stochastic behavior, according to a probability distribution represented by monitoring frequencies of the plurality of signal processors, each of which is given by adding the monitoring frequency $m_i$ and the probability value $\eta_i$.

5. A network monitoring method performed by a network monitoring device which monitors a network in which data is transmitted through a plurality of relays, said network monitoring method comprises, recording by a monitoring frequency recording unit which is configured to record monitoring frequencies each of which represents a monitoring frequency for monitoring a transmission status of a corresponding one of the plurality of relays;

generating, by a selection probability generating unit, selection probability information which is probability values for the plurality of relays;

determining, by a monitoring object determining unit, according to the monitoring frequency and the selection probability information, a relay the transmission status of which is to be monitored, from the plurality of relays;

obtaining, a transmission status obtaining unit, transmission status information indicating a transmission status on the relay determined by the monitoring object determining unit;

recording, by a transmission status recording unit, the transmission status information;

calculating, by an activation level calculating unit, based on a difference in activation level, which increases in accordance with a correlation between the transmission statuses and the monitoring frequencies of the plurality of relays, indicated by the transmission status information, an activation level indicating suitability of the monitoring on the transmission statuses of the plurality of relays; and updating, by a monitoring frequency updating unit, the monitoring frequency recorded on the monitoring frequency recording unit, based on a difference in monitoring frequency which increases in accordance with the activation level.

6. A bus system monitoring method by a bus system monitoring device to which a plurality of signal processors are connected and which transmits data processed by the plurality of signal processors, said bus system monitoring method comprises, recording by a monitoring frequency recording unit which is configured to record monitoring frequencies each of which represents a monitoring frequency for a data generation status of a corresponding one of the plurality of signal processors;

generating, by a selection probability generating unit, selection probability information which is a probability value for the plurality of signal processors;

determining, by a monitoring object determining unit, according to the monitoring frequency and the selection probability information, a signal processor the data generation status of which is to be monitored;

obtaining, by a generated data amount obtaining unit, generated data amount information indicating a data generation status on the signal processor determined by said monitoring object determining unit;

recording, by a generated data amount recording unit, the generated data amount information;

calculating, by an activation level calculating unit, based on a difference in activation level, which increases in accordance with a correlation between data amount generated in each signal processor and the monitoring frequencies of the plurality of signal processors, indicated by the generated data amount information, the activation level indicating suitability of the monitoring on the data generation statuses of the plurality of signal processors; and updating, by a monitoring frequency updating unit, based on a difference in monitoring frequency which increases in accordance with the activation level, a monitoring frequency recorded on said monitoring frequency recording unit.

7. A non-transitory computer-readable recording medium in which a computer program is stored, the program causing a computer to execute steps included in the network monitoring method according to claim 5.

8. A non-transitory computer-readable recording medium in which a computer program is stored, the program causing a computer to execute steps included in the network monitoring method according to claim 6.

9. A bus system monitoring device which transfers data on a bus while monitoring transmission status of a plurality of transmission paths on a semiconductor in which a plurality of cores are mutually connected through a plurality of relays, said bus system monitoring device comprising:

a monitoring frequency recording unit configured to record monitoring frequencies each of which represents a monitoring frequency for monitoring a corresponding one of the plurality of relays;

a selection probability generating unit configured to generate selection probability information which is probability values for the plurality of relays;

a monitoring object determining unit configured to determine, according to the monitoring frequency and the selection probability information, a relay which is to be monitored;

a transmission status obtaining unit configured to obtain transmission status information indicating a transmission status on the relay determined by said monitoring object determining unit;

a transmission status recording unit configured to record the transmission status information;

an activation level calculating unit configured to calculate, based on a difference in activation level, which increases in accordance with a correlation between the transmission statuses and the monitoring frequencies of the plurality of relays, indicated by the transmission status information, the activation level indicating suitability of the monitoring on the transmission statuses of the plurality of relays; and a monitoring frequency updating unit configured to update, based on a difference in monitoring frequency which increases in accordance with the activation level, the monitoring frequency recorded on said monitoring frequency recording unit.

10. The bus system monitoring device according to claim 9, wherein said selection probability generating unit is configured to provide said monitoring object determining unit with a value read from a list that consists of sequential numbers that is recorded in advance, as the selection probability information; and said monitoring object determining unit is configured to determine a relay associated with the value provided by said selection probability generating unit as the relay to be monitored.

11. The network monitoring device according to claim 1, wherein said monitoring frequency updating unit is configured to update a monitoring frequency for a set of relays.

* * * * *